(12) United States Patent
Malone et al.

(10) Patent No.: US 10,530,143 B2
(45) Date of Patent: Jan. 7, 2020

(54) STRESS CONTROL CONES FOR DOWNHOLE ELECTRICAL POWER SYSTEM TUBING ENCAPSULATED POWER CABLES

(71) Applicant: ACCESSESP UK LIMITED, Great Yarmouth (GB)

(72) Inventors: David Malone, Houston, TX (US);
Dwayne Leismer, Houston, TX (US);
Rogelio Cantu, Houston, TX (US);
Stephen Janert, Houston, TX (US)

(73) Assignee: ACCESSESP UK LIMITED, Great Yarmouth (GB)

( * ) Notice: Subject to any disclaimer, the term of this patent is extended or adjusted under 35 U.S.C. 154(b) by 0 days.

(21) Appl. No.: 16/138,733

(22) Filed: Sep. 21, 2018

(65) Prior Publication Data
US 2019/0089143 A1    Mar. 21, 2019

Related U.S. Application Data

(60) Provisional application No. 62/561,658, filed on Sep. 21, 2017.

(51) Int. Cl.
*H02G 15/064* (2006.01)
*H01B 7/04* (2006.01)
(Continued)

(52) U.S. Cl.
CPC ......... *H02G 15/064* (2013.01); *E21B 17/023* (2013.01); *E21B 17/028* (2013.01);
(Continued)

(58) Field of Classification Search
USPC .............................................. 174/74 R, 73.1
See application file for complete search history.

(56) References Cited

U.S. PATENT DOCUMENTS 1,589,505 A * 6/1926 Atkinson ............. H02G 15/064
174/73.1
1,642,514 A * 9/1927 Simons .................. H02G 15/10
174/73.1
(Continued)

OTHER PUBLICATIONS

European Patent Office—Extended European Search Report in counterpart EPO application 18196121.0 dated Feb. 12, 2019 including transmittal letter dated Feb. 25, 2019, 6 pages.

*Primary Examiner* — William H. Mayo, III
*Assistant Examiner* — Krystal Robinson
(74) *Attorney, Agent, or Firm* — Gordon G. Waggett, P.C.

(57) ABSTRACT

A stress cone for reducing electrical stresses is disclosed for use on terminated ends of tubing encapsulated power cable used in surface applications in a subsurface well power system employing electric submersible pumps (ESPs). The stress cone comprises an annular section about a longitudinal axis for receiving a terminated end of the TEPC in its first end and for abutting the terminated metal TEPC end against a metal shoulder at its second end therein, and an insulation chamber axially aligned with and connected to the annular section. The chamber comprises a metal interior surface symmetrical about the axis. The insulated TEPC core (without outer metal sheath) passes through the insulation chamber along the axis and then exits. The ID of the TEPC metal sheath and the inside metal surface of the chamber form a smooth ground plane transition surface. Insulation material surrounds the TEPC insulation layer within the insulation chamber.

38 Claims, 21 Drawing Sheets

(51) Int. Cl.
  *H01R 9/05* (2006.01)
  *E21B 43/12* (2006.01)
  *H01R 13/533* (2006.01)
  *E21B 17/02* (2006.01)
  *H01R 13/523* (2006.01)
  *H01B 7/20* (2006.01)

(52) U.S. Cl.
  CPC .......... *E21B 43/128* (2013.01); *H01B 7/046* (2013.01); *H01R 9/05* (2013.01); *H01R 13/523* (2013.01); *H01R 13/533* (2013.01); *H01B 7/20* (2013.01)

(56) References Cited

U.S. PATENT DOCUMENTS

| | | | | |
|---|---|---|---|---|
| 1,697,832 | A * | 1/1929 | Jansson | H01B 17/28 174/11 BH |
| 1,773,716 | A * | 8/1930 | Austin | H02G 15/103 174/21 JS |
| 1,895,396 | A * | 1/1933 | Pfannkuch | H02G 15/103 174/73.1 |
| 2,209,894 | A * | 7/1940 | Scott | H02G 15/30 156/48 |
| 2,219,910 | A * | 10/1940 | Webb | H02G 15/072 174/73.1 |
| 2,386,185 | A * | 10/1945 | Beaver | H02G 15/30 174/21 R |
| 2,492,437 | A * | 12/1949 | Palmer | H02G 15/32 174/142 |
| 2,696,518 | A * | 12/1954 | Roehmann | H01R 9/0512 174/21 C |
| 2,945,913 | A * | 7/1960 | Conangla | H02G 15/068 174/142 |
| 3,018,318 | A * | 1/1962 | Franklin | H02G 15/068 174/142 |
| 3,049,581 | A * | 8/1962 | Palmieri | H02G 15/068 174/142 |
| 3,051,770 | A * | 8/1962 | Palmieri | H02G 15/103 174/22 R |
| 3,352,962 | A * | 11/1967 | Brown | H02G 15/068 174/127 |
| 3,356,788 | A | 12/1967 | Callahan et al. | |
| 3,382,308 | A * | 5/1968 | Short | H02G 15/064 174/73.1 |
| 3,479,443 | A * | 11/1969 | Mashikian | H02G 15/072 174/73.1 |
| 3,523,157 | A * | 8/1970 | Holmes | H01B 17/306 174/142 |
| 3,860,741 | A * | 1/1975 | Troccoli | H02G 15/068 174/73.1 |
| 3,878,313 | A * | 4/1975 | Varner | H02G 15/06 174/19 |
| 4,053,702 | A * | 10/1977 | Erickson | H02G 15/068 174/73.1 |
| 4,234,439 | A * | 11/1980 | Kehr | H02G 15/068 174/73.1 |
| 4,681,985 | A * | 7/1987 | Katz | H02G 15/068 174/73.1 |
| 4,714,800 | A * | 12/1987 | Atkins | H01B 17/32 174/179 |
| 5,130,495 | A * | 7/1992 | Thompson | H02G 15/068 174/142 |
| 5,488,199 | A * | 1/1996 | Selsing | H02G 15/068 174/140 R |
| 5,570,611 | A * | 11/1996 | Pospisil | B60T 7/06 74/502.6 |
| 5,670,747 | A | 9/1997 | Lawer et al. | |
| 5,804,767 | A * | 9/1998 | Winfield | H02G 15/013 174/74 R |
| 5,900,585 | A * | 5/1999 | Winfield | H02G 15/184 174/74 R |
| 5,984,006 | A * | 11/1999 | Read | E21B 17/028 166/63 |
| 6,982,383 | B1 * | 1/2006 | Spellman | G01V 1/201 174/74 R |
| 8,870,590 | B2 * | 10/2014 | Hung | H01R 4/021 174/112 |
| 8,946,552 | B2 * | 2/2015 | Li | H02G 15/22 174/73.1 |
| 9,048,652 | B2 * | 6/2015 | Hoglund | H02G 15/046 |
| 2006/0124339 | A1 * | 6/2006 | Goehlich | H02G 15/003 174/74 R |
| 2006/0160430 | A1 | 7/2006 | Siddiqi et al. | |
| 2010/0206631 | A1 * | 8/2010 | Peters | H01R 4/203 174/77 R |
| 2011/0114358 | A1 * | 5/2011 | Takayasu | H02G 15/064 174/73.1 |
| 2013/0075124 | A1 * | 3/2013 | Li | H02G 15/22 174/19 |
| 2013/0102474 | A1 * | 4/2013 | Mukoyama | H01R 4/68 505/220 |
| 2013/0183853 | A1 | 7/2013 | Sivik et al. | |
| 2016/0172835 | A1 * | 6/2016 | Aishima | H02G 15/064 174/84 R |
| 2017/0204680 | A1 | 7/2017 | Leismer et al. | |
| 2019/0186210 | A1 | 6/2019 | Leismer et al. | |

\* cited by examiner

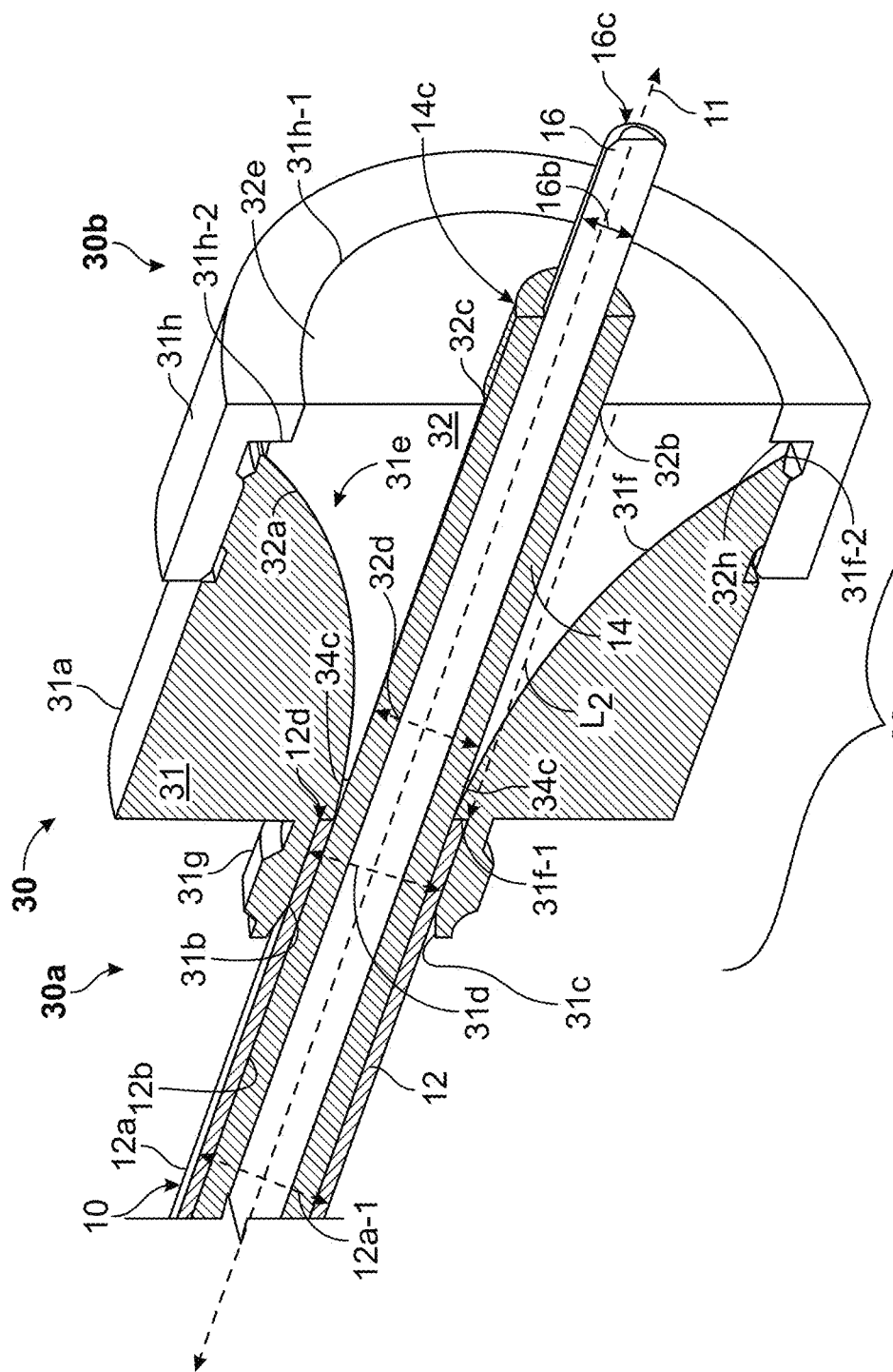

STRESS CONTROL CONES FOR DOWNHOLE ELECTRICAL POWER SYSTEM TUBING ENCAPSULATED POWER CABLES

CROSS-REFERENCE TO RELATED APPLICATIONS

This application claims the benefit of the filing date of and priority to: U.S. Provisional Application Ser. No. 62/561,658 entitled "Stress Control Cones for Downhole Electrical Power System Tubing Encapsulated Power Cables" and filed Sep. 21, 2017, Confirmation No. 2891; said provisional application is incorporated by reference herein in its entirety for all purposes.

STATEMENT REGARDING FEDERALLY SPONSORED RESEARCH OR DEVELOPMENT

Not Applicable.

BACKGROUND OF THE INVENTION

The following descriptions and examples are not admitted to be prior art by virtue of their inclusion in this section.

Hydrocarbon fluids such as oil and natural gas are obtained from a subterranean geologic formation, referred to as a reservoir, by drilling a well that penetrates the hydrocarbon-bearing formation. In some cases, a lack of formation pressure or the viscosity of the hydrocarbon produced from the formation (among other reasons) require the use of artificial lift systems to extract the hydrocarbon fluid from the well. One type of artificial lift system involves the use of electric submersible pumps (ESPs) to provide a motivating force for the extraction of fluid from the well.

The present disclosure relates generally to permanent downhole electrical connector systems installed onto a permanent completion use, e.g., with ESP applications. The present disclosure also relates generally to retrievable wet connector systems used in a downhole environment for, e.g., ESP applications. The present disclosure focuses on the ESP cable connections employed at the surface of such ESP applications.

ESP systems require connection to an electric power supply, which drives the motor (not specific to motor type). Conventional ESPs typically use electrical connectors that are assembled manually. These are simple plug and socket type connections, which must be fitted in a controlled environment.

In a typical ESP application (tubing deployed ESP), the electrical power is supplied to the electric motor from the surface VSD via an ESP cable. The ESP cable is installed onto the production tubing during the ESP installation and it is normally terminated in a MLE (motor lead extension) which incorporates a pothead. The pothead then is connected to the motor during the installation.

Typically, a male/female connector is employed that enables the connection between power supply and ESP to be made-up remotely, so that it is operable in the harsh conditions of an oil-well, where high pressures and temperatures are present, and the fluid filled environment may be corrosive.

With the retrievable ESP system, the ESP cable is installed onto the production tubing and the permanent completion and it is connected to the permanent downhole wet connector (fixed end). The power is then transferred to the motor through the retrievable mating wet connector (plug head) when this is deployed and connected to the downhole wet connector.

More particularly, the present disclosure relates to tubing encapsulated power cable (TEPC) used with ESP applications, and to a stress cone adapted for installation on the terminated end of the TEPC at the surface.

An extended cable may be provided to power an ESP located at a distance downhole. This cable would have to survive the incredibly harsh environment of the wellbore. To facilitate survival, various layers of insulation and coatings may surround the individual conduits providing the electricity. However, terminations of cables, such as terminating a power cable into another component such as a connector housing, present challenges in properly cutting and preparing the cable for establishing a reliable connection to another component. Improper or incorrect termination may generate unintended leak paths and corrosion due to contamination by wellbore fluid as well as creating potential concentrations of electrical stresses due to non-uniform cable cutting.

ESP power systems (ESP cables and the associated connectors and feed-throughs) are very complex, long (typically 5,000 ft) power delivery systems that must withstand very high voltages (typically 5 KVAC phase to phase) over long periods of operation (10+ years) in a high temperature, high pressure environment (producing wellbore). The insulation that provides electrical isolation within the power systems must withstand these conditions in the presence of reactive and corrosive gases and fluids ($H_2S$, $CO_2$, Water, chlorides, etc.) that are damaging to most insulations. In addition, ESP cables are subjected to extreme mechanical stress during installation and operation.

The industry typically uses a lead sheath or other 'non-reactive' barrier to provide a 'chemical barrier' between the wire insulation and the fluids in the wellbore. Although these barriers can be effective in isolating the insulation from the damaging fluids, they are highly susceptible to damage in that they are soft, easy to tear, and hard to terminate. ESP power system failures often occur at the termination of the protective sheath or where the sheath is not present (e.g., at connectors, splices, feed-throughs, and sites of mechanical damage to sheath).

Past attempts have been made to use a robust sheath (metallic tube instead of lead) but these have failed for several reasons. For example, traditionally, the metallic sheath of TEPC is very difficult to terminate in the field, making installation in the field impractical. Additionally, another source of failure is the voltage stress induced by the metallic sheath in high voltage applications leading to premature failure.

Typically, the ESP power delivery system is responsible for 15-35% of ESP failures. The replacement of a failed ESP system will typically cost $300 K to $15 MM, not including the cost of the lost production while the ESP system is non-operational (it can take up to one year to replace). This cost represents a huge burden on oil and gas operations.

Therefore, there continues to exist a need to provide an enhanced power delivery system that minimizes voltage stress within high voltage ESP power systems, particularly where field termination of TEPC is employed.

Applicant AccessESP UK Limited has developed new termination techniques that do not require these difficult field terminations, such as those described in, e.g., copending U.S. patent application Ser. No. 15/408,336, filed Jan. 17, 2017, Publication No. 20170204680, which is incorporated herein by reference in its entirety. Applicant has also developed improved systems and methods for cutting and preparing the cable ends for establishing a reliable connection to another component. Examples of such improvements are described in copending U.S. Provisional Patent Application Ser. No. 62/561,654, filed on Sep. 21, 2017 entitled "System and Method for Terminating Cable", which is incorporated herein by reference in its entirety.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

A stress cone is disclosed, for installation on the terminated end of TEPC used at the surface with ESP applications in subsurface wells, and comprising an annular section oriented about a longitudinal axis for receiving a terminated end of the TEPC, and an insulation chamber axially aligned with and connected to the first annular section for reducing electrical stresses in the area of the termination. The chamber comprises a metal interior surface that is symmetrical about the axis, such as a conical surface. When a portion of the outer metal sheath of the TEPC is removed to expose the underlying insulated conductor core, the terminated end of the TEPC is insertable into to the annular section until its cut metal end abuts a metal shoulder within the cone located at the interface of the annular section and the chamber. The insulated core passes through the insulation chamber along the axis and then exits. The inside diameter of the TEPC metal sheath and the inside metal surface of the chamber form a smooth ground plane transition surface. Insulation material surrounds the TEPC insulation layer within the insulation chamber.

In one embodiment, there is disclosed a stress cone for use on a terminated end of TEPC used in surface applications of a subsurface well power system employing ESPs. Typically, the TEPC comprises a central conductor section of a first outer diameter $OD_1$. A TEPC insulation layer coaxially surrounds the conductor and has a second outer diameter $OD_2$. A metal tubing sheath coaxially surrounds the TEPC insulation layer, and has an internal diameter $ID_1$ equal to the second outer diameter $OD_2$, a third outer diameter $OD_3$, and a sheath width defined as the difference between the $ID_1$ and the $OD_3$. The terminated end of the TEPC creates a sheath termination end face. The TEPC insulation layer and conductor section extend for a desired length beyond the sheath termination end face. The conductor section extends for a desired length beyond a termination end of the TEPC insulation layer—i.e., a stripped or terminated TEPC end comprising an uninsulated section of conductor, and an unsheathed section of insulator layer extending beyond the terminated (cut) sheath.

In this embodiment, the stress cone, the stress cone comprises: a housing, an internal insulation chamber capable of receiving an insulator material and a TEPC tubing coupler. The housing may comprise an inlet end and an outlet end oriented about a longitudinal axis, the inlet end capable of receiving the sheath terminated end face, the outlet end capable of permitting the TEPC insulation layer termination end to extend therethrough and out of the housing. The internal insulation chamber is located within the housing between the inlet end and the outlet end and comprises an internal metal surface oriented about the axis, the internal metal surface defining a desired shape about the axis, the TEPC insulation layer capable of extending therethrough.

The stress cone further comprises a TEPC tubing coupler section axially aligned about the axis at the housing inlet end. The coupler comprises an annular section oriented about the axis of an inside diameter $ID_2$ equal to the TEPC sheath $OD_3$ having a coupler first end opening and a coupler second end opening of a smaller inside diameter $ID_3$ equal to the TEPC insulation layer $OD_2$. The coupler first end opening is capable of receiving the terminated end of the TEPC sheath therethrough. The coupler second end opening leads into the internal insulation chamber and is sized to receive the TEPC insulation layer therethrough. The insulation chamber is capable of receiving the desired length of the TEPC insulation layer therethrough along the axis. The coupler further comprises a radially inwardly protruding metal shoulder at the coupler second end comprising a shoulder mating surface facing toward the coupler first end opening, the shoulder mating surface having a depth equal to the sheath width and capable of mating with the sheath termination end face when the terminated TEPC sheath is inserted into the annular section, the shoulder also defining the coupler second opening and a tubing coupler mechanism capable of securing the TEPC within the coupler annular section.

The stress control cone of this embodiment further comprises an insulation material contained within the internal insulation chamber capable of insulating between the TEPC insulation layer $OD_2$ and the insulation chamber internal metal surface when the TEPC is secured within the coupler annular section and the TEPC insulation layer is extending through the internal insulation chamber and out through the housing outlet.

In one embodiment, the insulation chamber internal metal surface is oriented symmetrically about the axis and defines a desired symmetrical shape about the axis. In one embodiment, the TEPC insulation layer extends through the insulation layer centered symmetrically about the axis.

In one embodiment, the outlet end of the housing further comprises an end cap which when removed, permits placement of the insulation material within the insulation chamber, and when attached, retains the insulation material within the insulation chamber, the end cap further comprising an apertured opening capable of permitting the TEPC insulation layer termination end to extend therethrough and out of the housing. The end cap may further comprise a sealed connection to the housing and the apertured opening may further comprise a seal for sealing around the TEPC insulation layer.

In another embodiment, there is disclosed a stress cone for attachment over a terminated end of a TEPC used in surface applications of a subsurface well power system employing electric submersible pumps. In this embodiment, the stress cone comprises a tubing coupler capable of receiving the terminated end of the TEPC and an enclosed insulation chamber capable of receiving an insulation material. As is understood, the TEPC comprises a central conductor wire, a TEPC insulation layer of a desired outer diameter coaxially surrounding the conductor wire, and a metal tubing sheath having a desired wall thickness and diameter coaxially surrounding the TEPC insulation layer. The TEPC termination end comprises an end portion of the TEPC wherein a portion of the sheath has been cut off leaving a sheath termination end face and leaving a section of the TEPC insulation layer extending beyond the sheath termination face, and wherein a portion of the TEPC insulation layer has been removed from the extended section of the TEPC insulation layer to expose a desired section of the conductor wire.

In this embodiment, the tubing coupler comprises a coupler annular section comprising a coupler inlet end and a coupler outlet end oriented about a longitudinal axis. The coupler inlet end has an inner diameter capable of receiving the sheath terminated end face. The coupler outlet end permits the TEPC insulation layer termination end to extend therethrough. The coupler outlet end comprises a reduced inside diameter shoulder stop of inside diameter equal to the insulation layer outer diameter. The shoulder stop further comprises a shoulder mating surface facing toward the coupler inlet, the shoulder mating surface having a depth equal to the sheath wall thickness and capable of mating with the sheath termination end face when the terminated TEPC sheath is inserted into and secured to the coupler inlet end.

The stress cone of this embodiment also comprises an enclosed insulation chamber capable of receiving an insulation material. This chamber comprises an insulation chamber inlet end coterminous with the coupler outlet end. The chamber also has an insulation chamber internal metal surface oriented symmetrically about the axis. The internal metal surface defines a desired symmetrical shape about the axis. The TEPC insulation layer is capable of extending therethrough along the axis and is capable of being surrounded by the insulation material received within the insulation chamber. The chamber further comprises an insulation chamber outlet end comprising an apertured opening capable of receiving the extended section of the TEPC insulation layer therethrough.

In various embodiments described herein, the insulation chamber is devoid of air when the TEPC insulation layer extends therethrough.

In one embodiment, the desired shape of the insulation chamber internal metal surface may be selected from the group consisting of conical-, frustoconical, trumpet-, and bell-like shapes. Each of the desired shapes may have a first end and a second end, wherein the first end has a narrower diameter about the axis than the second end, and wherein the first end is coterminous with the coupler second opening.

In one embodiment, the stress cone shoulder mating surface and the sheath termination end face are oriented at 90° relative to the axis to permit tight mating of the two surfaces. In other embodiments, the two faces may be opposed beveled surfaces that likewise permit tight mating. In one embodiment, when mated together, the mated faces are devoid of air. In other embodiments, the mated surfaces are devoid of surface irregularities.

Ideally, the construction of the interface between the TEPC sheath $ID_1$ and the insulation chamber internal metal surface within the stress cone forms a continuous ground plane transition surface when the TEPC sheath is secured within the stress cone.

The stress cones described herein can employ an assortment of suitable insulation materials to use in the insulation chamber, including, for example, engineered polymers, perfluoroalkoxy (PFA), polyethylenes (PE), cross-linked polyethylenes (XLPE), ethylene propylene diene M-class (EPDM), ethylene propylene rubber (EPR), expanded polytetrafluoroethylene (ePTFE), corona-resistant PTFE, plastics, dielectric materials, dielectric fluids, grease, epoxy, urethane, polyetherimide, acrylic, PVC, polycarbonate, silicone rubber, polyester, polyamide, polyimide, polyamine, polypropylene laminated paper (PPLP), PTFE, oil, gas, perfluorinated liquids, composites, ceramics, brazed ceramics, glass, and porcelain, and combinations thereof. The stress cones described herein can employ insulation materials that are solid, liquid, gas or combinations thereof.

In various embodiments, the insulation material is a solid material insertable into, and occupying, the internal insulation chamber, the solid material further comprising an outer surface corresponding to the insulation chamber internal metal surface, and an insulation material annulus oriented therethrough about the axis and capable of receiving the TEPC insulation layer therethrough, the insulation annulus having a first end coterminous with the coupler second or outlet end opening, a second end coterminous with the housing or insulation chamber outlet and an inner annular surface therebetween. In these embodiments, the insulation material may be mounted within the insulation chamber using a dielectric-based adhesive, such as, for example, an epoxy-, silicone- or rubber-based adhesive. In other embodiments, the insulation material is mounted within the insulation chamber with a dielectric fluid present between the insulation chamber internal metal surface and the insertable insulation material outer surface, and between the insertable insulation material inner annular surface and the TEPC insulation layer.

In various embodiments, the insulation chamber outlet end (or the housing outlet end) further comprises an end cap which when removed, permits placement of the insulation material within the insulation chamber, and when attached, retains the insulation material within the insulation chamber, the end cap further comprising an apertured opening capable of receiving and permitting the extended section of the TEPC insulation layer to extend therethrough and out of the insulation chamber. The end cap may further comprise a seal for sealing it to the insulation chamber or housing, and a seal around the aperture opening for sealing around the TEPC insulation layer.

In one embodiment of the stress cone, the insulation material is a solid material insertable into, and occupying, the internal insulation chamber. In this embodiment, the solid material further comprises an outer surface corresponding to the insulation chamber internal metal surface, and an insulation material annulus oriented therethrough about the axis and capable of receiving the TEPC insulation layer therethrough, the insulation annulus having a first end coterminous with the coupler outlet end, a second end coterminous with the insulation chamber outlet, and an inner annular surface between the first and second annulus ends. In one embodiment, the insulation material may be mounted within the insulation chamber using a dielectric-based adhesive, such as, for example, an epoxy-, silicone- or rubber-based adhesive. In other embodiments, the insulation material is mounted within the insulation chamber with a dielectric fluid present between the insulation chamber internal metal surface and the insertable insulation material outer surface, and between the insertable insulation material inner annular surface and the TEPC insulation layer.

In yet another embodiment, there is disclosed a high-pressure connector assembly for use on a terminated end of a tubing encapsulated power cable (TEPC) used in applications of a subsurface well power system employing electric submersible pumps, the TEPC comprising a central conductor section of a first outer diameter $OD_1$, a TEPC insulation layer coaxially surrounding the conductor and having a second outer diameter $OD_2$, and a metal tubing sheath coaxially surrounding the TEPC insulation layer, and having an internal diameter $ID_1$ equal to the second outer diameter $OD_2$, a third outer diameter $OD_3$, and a sheath width defined as the difference between the $ID_1$ and the $OD_3$, the terminated end of the TEPC creating a sheath termination end face, the TEPC insulation layer and conductor section extending for a desired length beyond the sheath termination end face, the conductor section extending for a desired length beyond a termination end of the TEPC insulation layer and terminating at central conductor termination end. In this embodiment, the high-pressure connector assembly comprises: a metal housing comprising an inlet end and an outlet end oriented about a longitudinal axis; an annular space located about the axis within the housing between the inlet end and the outlet end defined by inner housing metal surfaces, and a first high-pressure metal pressure fitting capable of receiving the sheath terminated end face and securing the TEPC cable into the housing inlet end in a pressure-tight seal.

The first high-pressure metal pressure fitting further comprises a fitting annular section comprising a fitting inlet end and a fitting outlet end oriented about the longitudinal axis, the first fitting inlet end having an inner diameter capable of receiving the sheath terminated end face, the first fitting outlet end capable of permitting the TEPC insulation layer termination end to extend therethrough, the first fitting outlet end comprising a reduced inside diameter shoulder stop of inside diameter equal to the insulation layer outer diameter, the shoulder stop further comprising a shoulder mating surface facing toward the fitting inlet, and the shoulder mating surface having a depth equal to the sheath wall thickness and capable of mating with the sheath termination end face when the terminated TEPC sheath is inserted into and secured to the first fitting inlet end.

The high-pressure connector assembly further comprises a second high-pressure pressure fitting located at the outlet end; a conductor pin mounted along the axis within the annular space and having a first end capable of being mounted in electrical conductive contact with the conductor section terminal end, and a second conductor pin end extending into the second high-pressure pressure fitting; a socket to socket type connector located about the axis within the annular space comprising a first socket connector end for receiving the desired length of the conductor section extending beyond the termination end of the TEPC insulation layer, and a second end for receiving the first end of the conductor pin in abutted engagement with the conductor section terminal end.

36. The high-pressure connector assembly also comprises an enclosed insulation chamber formed within the annular space capable of receiving an insulation material comprising an insulation chamber inlet end coterminous with the first fitting outlet end, an insulation chamber internal metal surface oriented symmetrically about the axis, the internal metal surface comprising an electrical stress relief zone proximate the insulation chamber inlet end defining a desired symmetrical shape about the axis, the TEPC insulation layer capable of extending therethrough along the axis and being surrounded by the insulation material received within the insulation chamber, the socket to socket connection and conductor pin first end being surrounded by the insulation material, and an insulation chamber outlet end comprising an apertured opening capable of receiving the conductor pin second end therethrough and secured in sealed fashion. An insulation material fills the annular space. The second high-pressure fitting located at the outlet end is capable of being secured, in pressure sealed fashion, to another TEPC cable. The desired shape may be selected from the group consisting of conical-, frustoconical-, trumpet-, and bell-like shapes. The high-pressure connector assembly insulation material may be selected from the group consisting of brazed ceramics or glass, wherein the brazed ceramics and glass insulation materials are physically sealed to the inner housing metal surfaces, and wherein the insulation material is physically sealed about the conductor pin.

BRIEF DESCRIPTION OF THE SEVERAL VIEWS OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 5B illustrates the stress control cone of FIG. 5A shown with the retaining or end cap attached.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

Reference is now made to the drawings which depict preferred embodiments, but are not drawn to scale.

In some embodiments, an artificial lift system for the production of downhole hydrocarbon fluids includes the use of an Electric Submersible Pump (ESP). ESP's can be powered in many ways, but one way is through the use of a power cable. The power cable itself must be able to withstand the corrosive and toxic environment of the downhole environment.

For uninterrupted sections of cables, various layers of insulation and armor of a housing can adequately provide this protection. However, to power another component a cable must be terminated and electrically coupled to the component. Accordingly, the termination of a cable may provide a weak spot or opening for wellbore fluid to leak into, potentially corroding or contaminating the power cable.

Preparations for terminating a cable to another component involves cutting through the layers of protection to allow the clear conduction of power into the component. If the cable is incorrectly cut due to an improper technique or tool, the armor coatings may be deformed or torn, resulting in electrical stress concentration points.

To minimize the voltage stress or electric field perturbations, an ESP power delivery system is provided with a geometrically consistent ground plane from the motor windings to the surface termination. Minimizing voltage stress increases reliability and run life. Minimizing voltage stress is achieved in numerous locations of the system:

In one embodiment, stress cones are also disclosed herein for mounting about tubing terminations to minimize field stress. Additionally, there are disclosed tools used to install the stress cones in the field without damage to the insulation.

Figure 1:
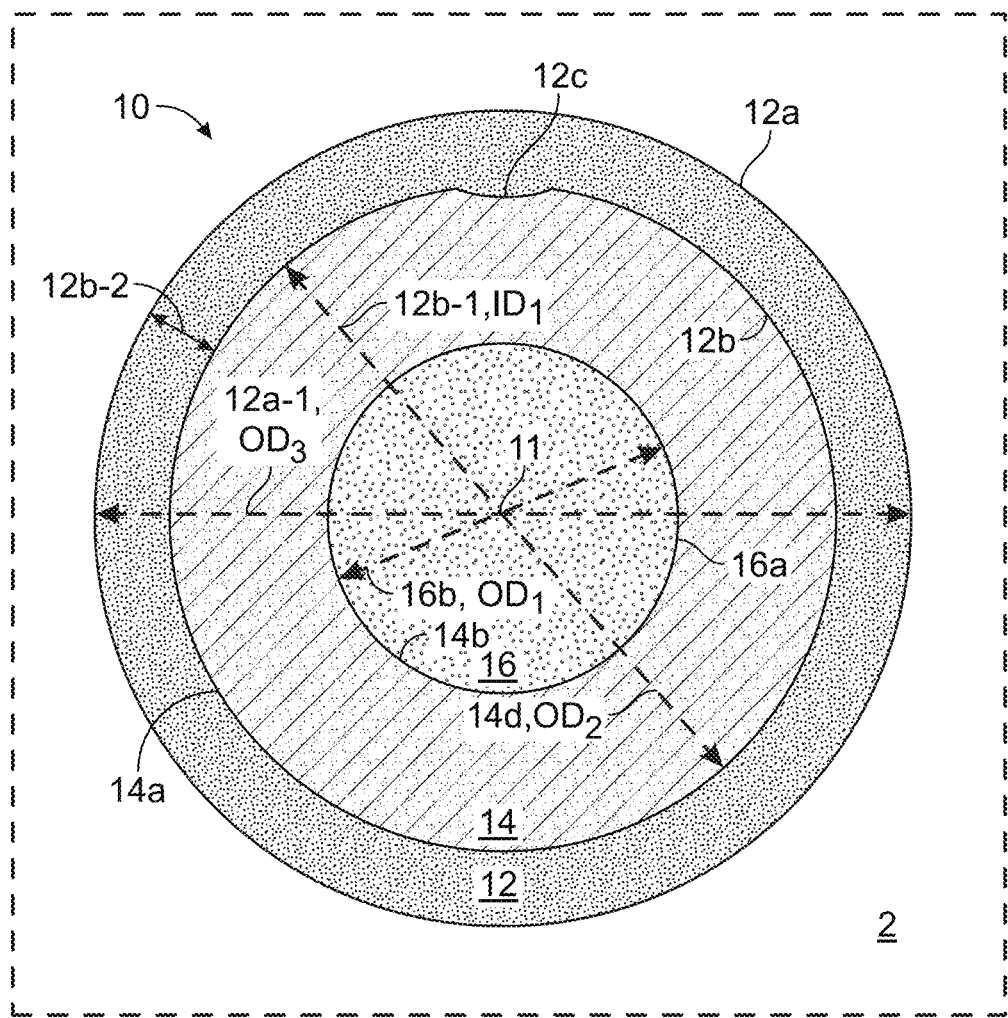
FIG. 1 shows a cross-sectional view through a typical single conductor TEPC (wire in tube) used in a plug illustrating the weld bead on the inside diameter of the protective outer sheath of the TEPC.

Referring now to FIG. 1 there is depicted a cross-sectional view of a typical high voltage EPS cable geometry used in, e.g., a plug, such as for a TEPC 10 (wire in tube) existing in air or wellbore fluid 2. This illustration shows a cross-section of a tubing encapsulated power cable (TEPC) 10, such as the one produced by AccessESP® for example. TEPC cable 10 is part of a system configured to deliver power to subsurface ESP (Electric Submersible Pump) systems (not shown). The TEPC 10 comprises a central conductor core 16 (typically comprising a cylindrical copper wire) centered about a longitudinal axis 11 and having an outer surface 16a of a desired outer diameter 16b ($OD_1$).

The conductor 16 is coaxially surrounded by a conductor cable insulation layer 14 having an outside surface 14a of a desired outer diameter 14d ($OD_2$) (e.g., an outer diameter essentially equal to the outer sheath inner diameter 12b-1 ($ID_1$)) and an inside surface 14b against and contacting the conductor outer surface 16a. The conductor insulator layer 14 functions to separate the conductor 16 (e.g., copper, tin copper, among others) from the conductive armor layer or sheath 12. In preferred embodiments, the conductor core 16 comprises a cylindrical copper wire surrounded by a uniform layer of insulation 14. The insulation layer 14 is coaxially surrounded by an ESP cable outer tubular sheath 12 typically constructed from stainless steel material or other metal material or the like. The sheath 12 comprises an ESP cable outer sheath outside surface 12a defining an ESP cable outside diameter 12a-1 ($OD_3$) and an outer sheath inside surface 12b defining an outer sheath inside diameter 12b-1 ($ID_1$). The sheath has a sheath width 12b-2 defined by the distance between its inner and outer diameters. Typically, the tubular outer sheath 12 is formed via a welding process that leaves a longitudinal weld bead 12c along inside surface 12b. The TEPC has a termination end 10a where the cut outer sheath forms a terminal rim (cut end) face 12d. The terminal rim face 12d further comprises an outer edge 12e and an inner edge 12f.

The sheath 12 may be selected with regards to corrosion resistance as well as life. In a traditional motor lead extension (MLE) conduit (not shown) lead may be used as the conduit housing.

The performance of TEPC cable 10 can be greatly compromised by the techniques used to cut the cable and prep the ends for termination in different downhole components. Traditional tubing cutters deform the sheath 12 and press the sheath 12 into the insulator layer 14 underneath. Unfortunately, this deformation can reduce the electrical insulation capability of the insulator layer 14.

Another issue is the generation of an electrical stress riser at the face of the sheath 12d where the sheath 12 is cut. Sharp cross-sectional edges may lead to areas where electrical charge can accumulate in high voltage applications such as are possible for the TEPC cable 10. Traditional tubing cutters may leave a burr when they cut the sheath 12 leading to one of these stress risers. Over time these areas may often lead to electrical failure due to the insulative properties of the insulator layer 14 being overly stressed by the accumulation of charge on the electrical stress riser.

All of these exemplary issues may be addressed in a controlled, machining environment. However, these exemplary issues become much more difficult to address when the TEPC cable 10 is being prepped on the rig floor or in other field activities where controlled facilities are not available (also referred to as field termination). The tools needed must have a small profile and be operable by hand in confined spaces. Additionally, if the tools do not need outside power, there is a further reduction in the quantities of necessary or required equipment.

Often, field termination of a TEPC 10 requires cutting through the outer sheath 12 to remove a terminal end length of the sheath 12 to expose the interior insulation 14. A terminal portion of the interior insulation 14 is then removed to expose a terminal length ($L_1$) of the conductor 16 extending beyond the desired terminal length ($L_2$) of exposed insulation layer 14 at its terminal end 14c. The conductor terminal end 16c of the conductor 16 is then ready to interface with the next desired connection (not shown).

Figure 2A:
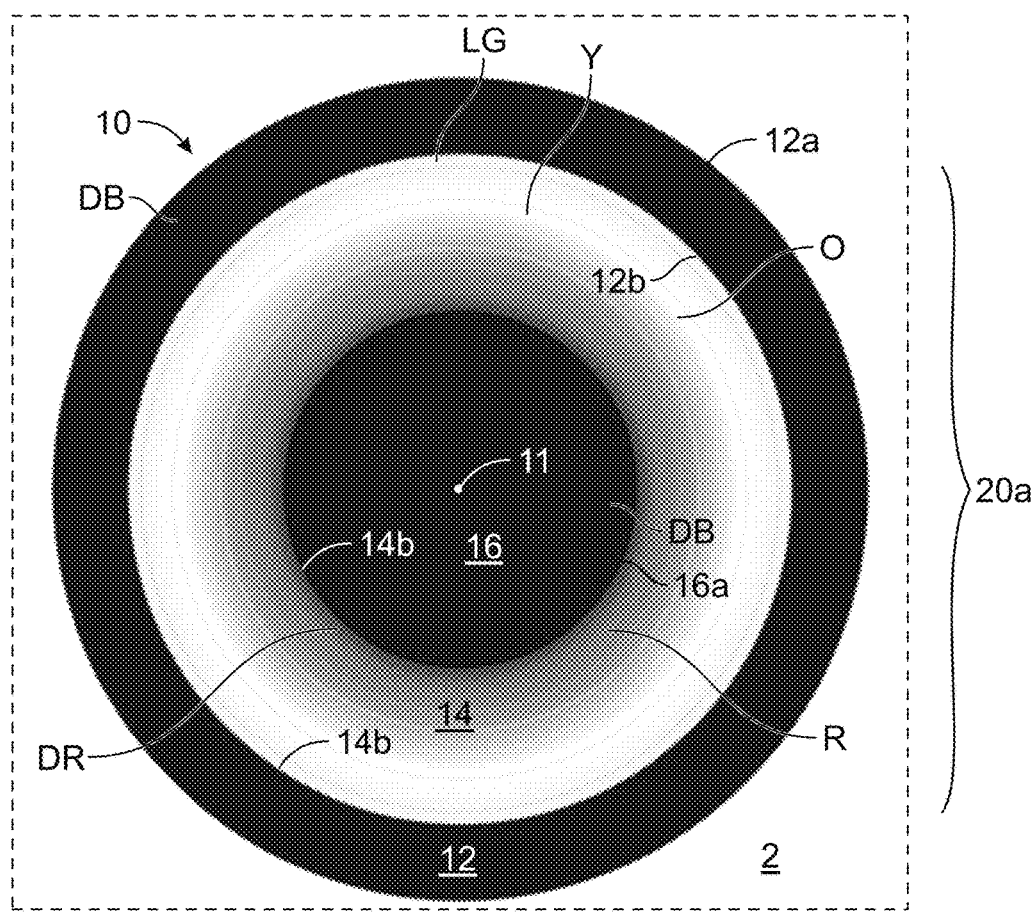
FIG. 2A illustrates the ground plane (electric fields) created by the outer protective sheath of a TEPC without weld bead.
Figure 2B:
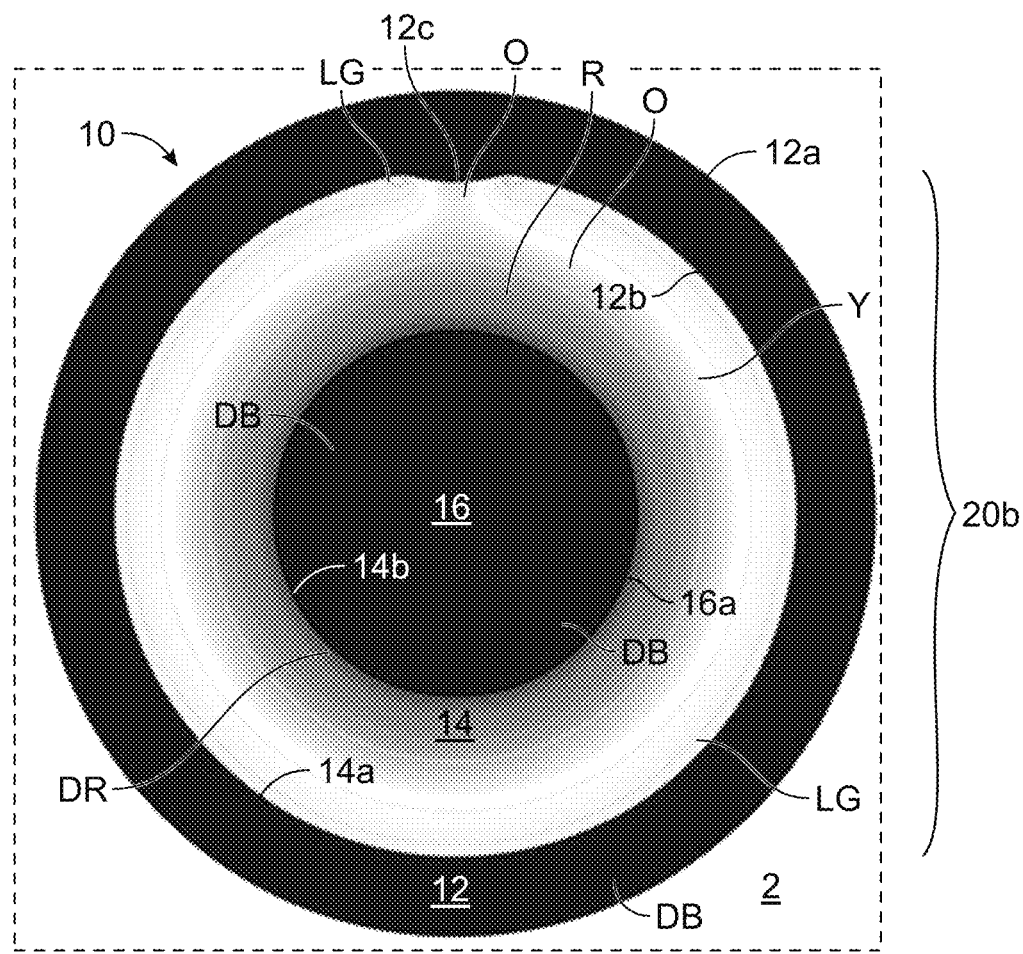
FIG. 2B illustrates the perturbations in the ground plane (electric fields) created by the weld bead in the outer protective sheath of a TEPC.
Figure 3A:
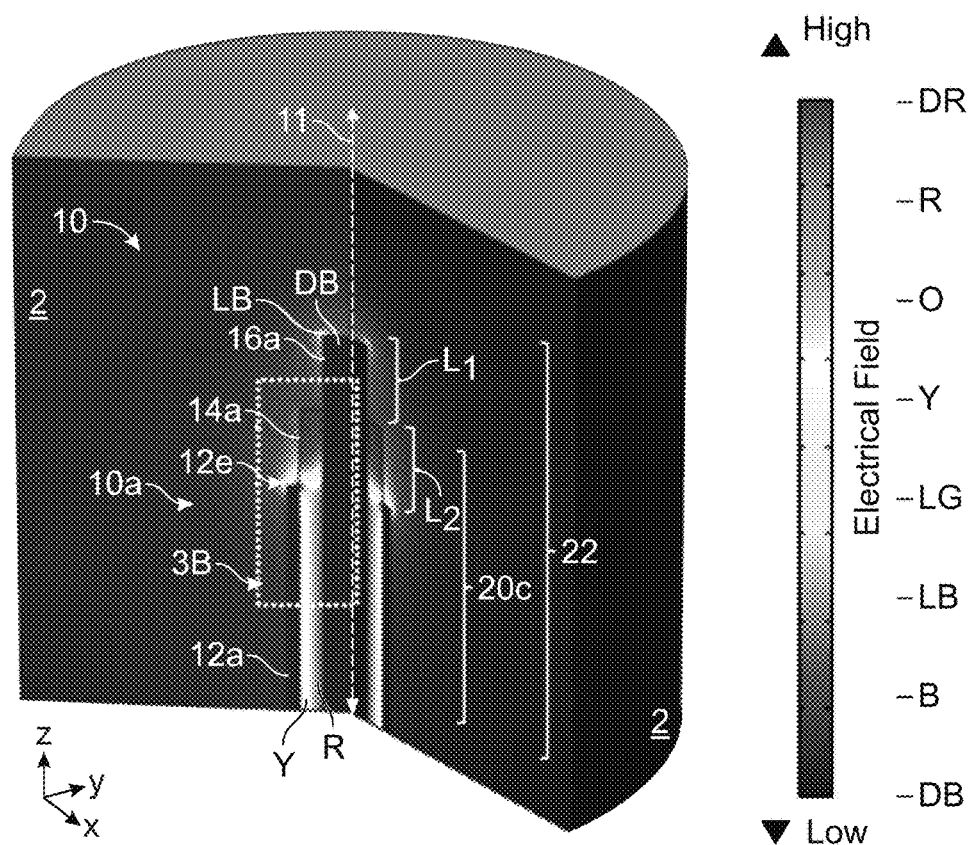
FIG. 3A illustrates the high stresses in the wire insulation created in the region of a field termination (cut tube) of a TEPC.
Figure 3B:
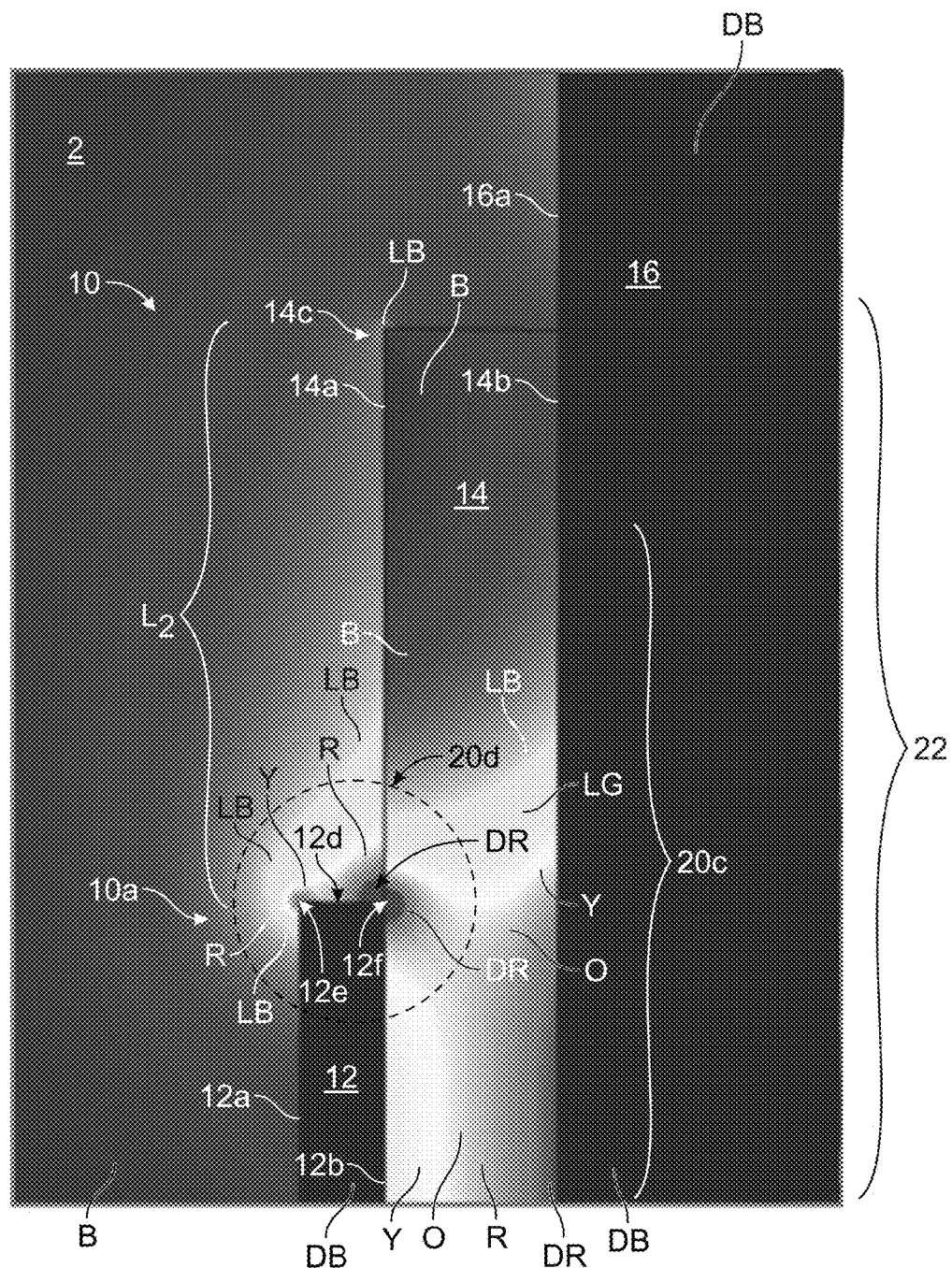
FIG. 3B shows an enlargement of area 3B from FIG. 3A.

Typically, high voltage stresses are induced in any location where a continuous and geometrically consistent ground plane is not present. As is illustrated in FIG. 2A, the ground plane 20a (created by the protective sheath 12) is geometrically consistent in a radial direction about axis 11 except for around the weld bead 12c (as illustrated in FIG. 2B ground plane 20b). FIG. 2B illustrates the impact of the weld bead on the electric field 20b across the cross section of the tube 10. Perturbations in the electric field 20b can be seen proximate to the weld bead 12c. In this case the perturbation of the field 20b is small, with the weld bead 12c increasing the electric field stress by only 1.8% (so long as the weld bead 12c geometry is controlled). Note that the following color codes are used in FIGS. 2A, 2B, 3A, 3B and 9: Dark Red (DR), Red (R), Orange (O), Yellow (Y), Light Green (LG), Light Blue (LB), Blue (B) and Dark Blue (DB). It will be understood by the color coding on the figures that in certain areas, a spectrum of colors many appear, with one color blending into another, and that such blended color areas will be apparent by reference to the adjacent color codes.

However, there are locations in the power delivery system where this perturbation effect is much more severe, a primary example being in the termination zone 22 of the ends 12d of the cut tube 10 (terminations). It is necessary to cut and remove the protective tube (sheathing) 12 covering the insulation 14 at numerous points in the power delivery system to access the conductor 16. The tube 12 must be 'stripped' to terminate the cable 10 into connectors and at the surface to connect it to the surface infrastructure (e.g., variable speed drives, transformers).

It is important that the tube cutting tool generates a clean cut of the tubing with minimal (preferably no) damage to the underlying insulation. This cutting must be performed at the wellsite. If the tube 12 is cut and removed, without any treatment of the tube ends 12d, the resulting electric field stresses 20c (FIGS. 3A, 3B) will typically be increased by 300-400% over baseline levels (in the simulation depicted in FIGS. 3A and 3B). This field will create high stresses in the wire insulation, particularly proximate the inner edge 12f of the cut sheath 12 resulting in premature failure and in the intensified zone of ground plane/electric field perturbation 20d caused by cut tube end. For example, the cut ends may create burrs or irregularities along the cut tubing end inner and outer edges (12f, 12e) or along the cut tubing face 12d (i.e., generating what would not be a clean cut). Furthermore, typical tube cutters can deform the sheath tube 12, pressing it into the insulation 14 thereby creating high electrical stress fields at the tubing termination. As noted above, improved tubing termination systems and methodologies are disclosed in copending U.S. Provisional Patent Application Ser. No. 62/561,654, which can mitigate the creation of such stress zones created by the process of cutting the sheath layer 12 from the TEPC 10. Nonetheless, with or without the use of such preferred cable termination systems and methodologies, there remains a need to minimize or mitigate these TEPC termination end voltage stress effects in the termination zone 22.

Figure 4A:
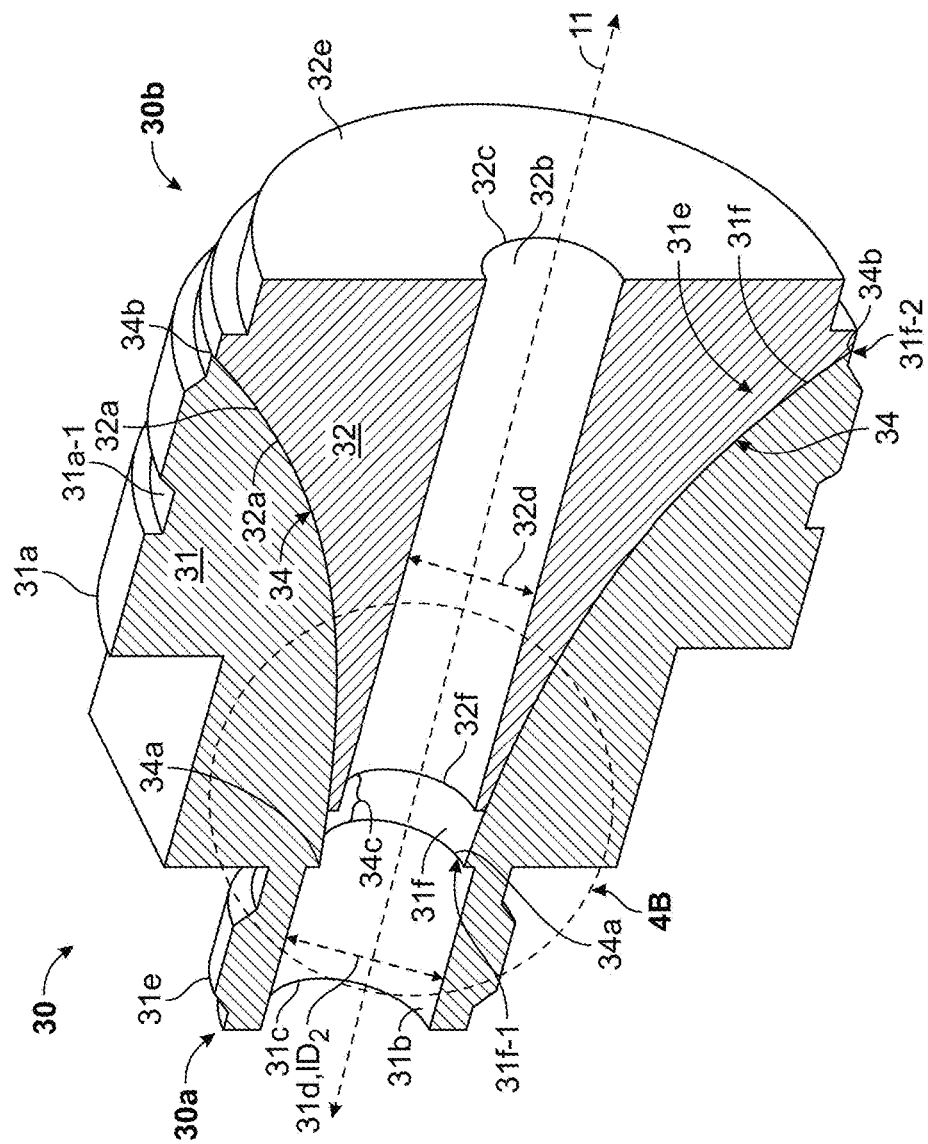
FIG. 4A illustrates a longitudinal cross-sectional perspective view of a stress control cone for use with TEPC in accordance with embodiments of the present invention.
Figure 4B:
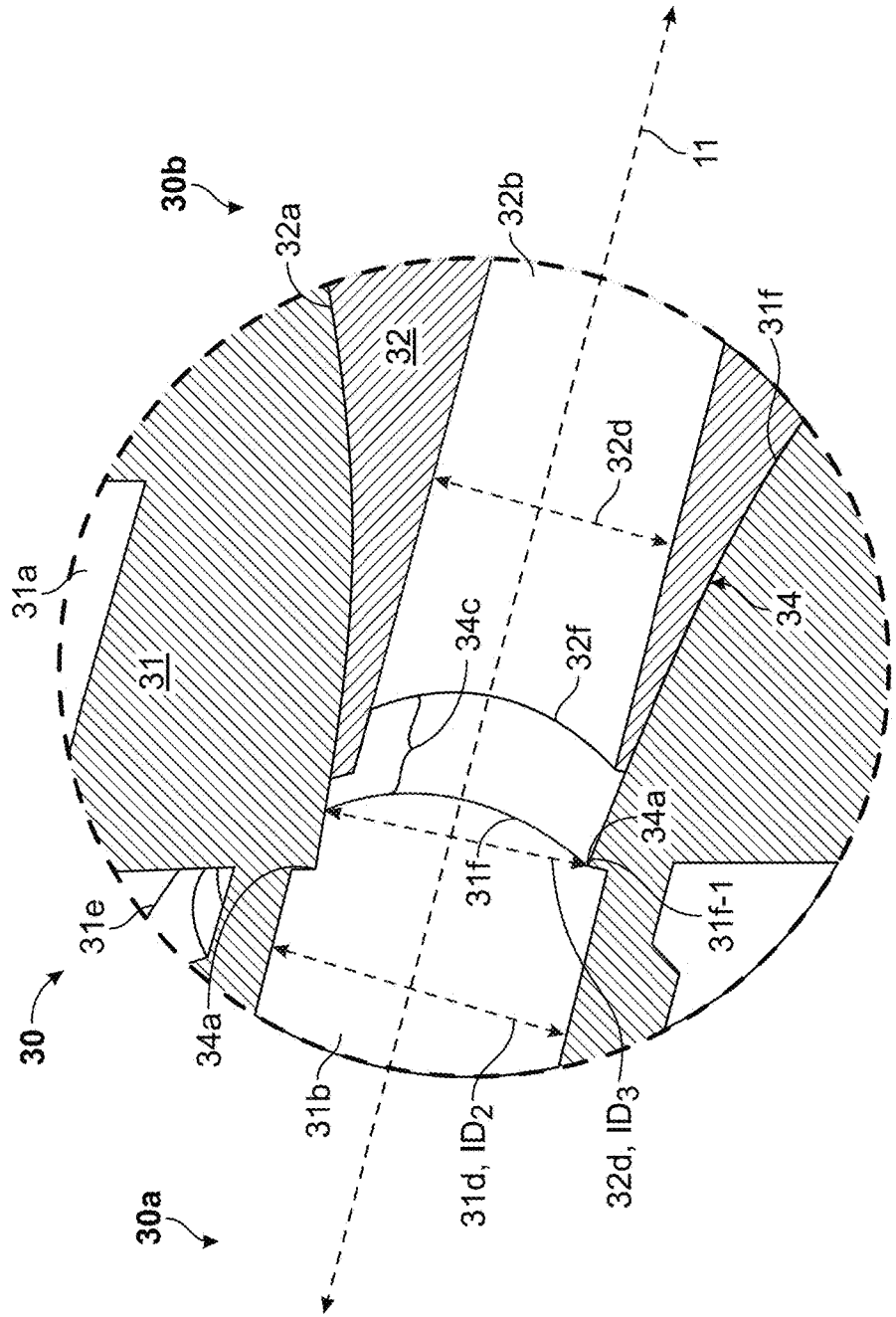
FIG. 4B illustrates an enlargement of area 4B from FIG. 4A.
Figure 5A:
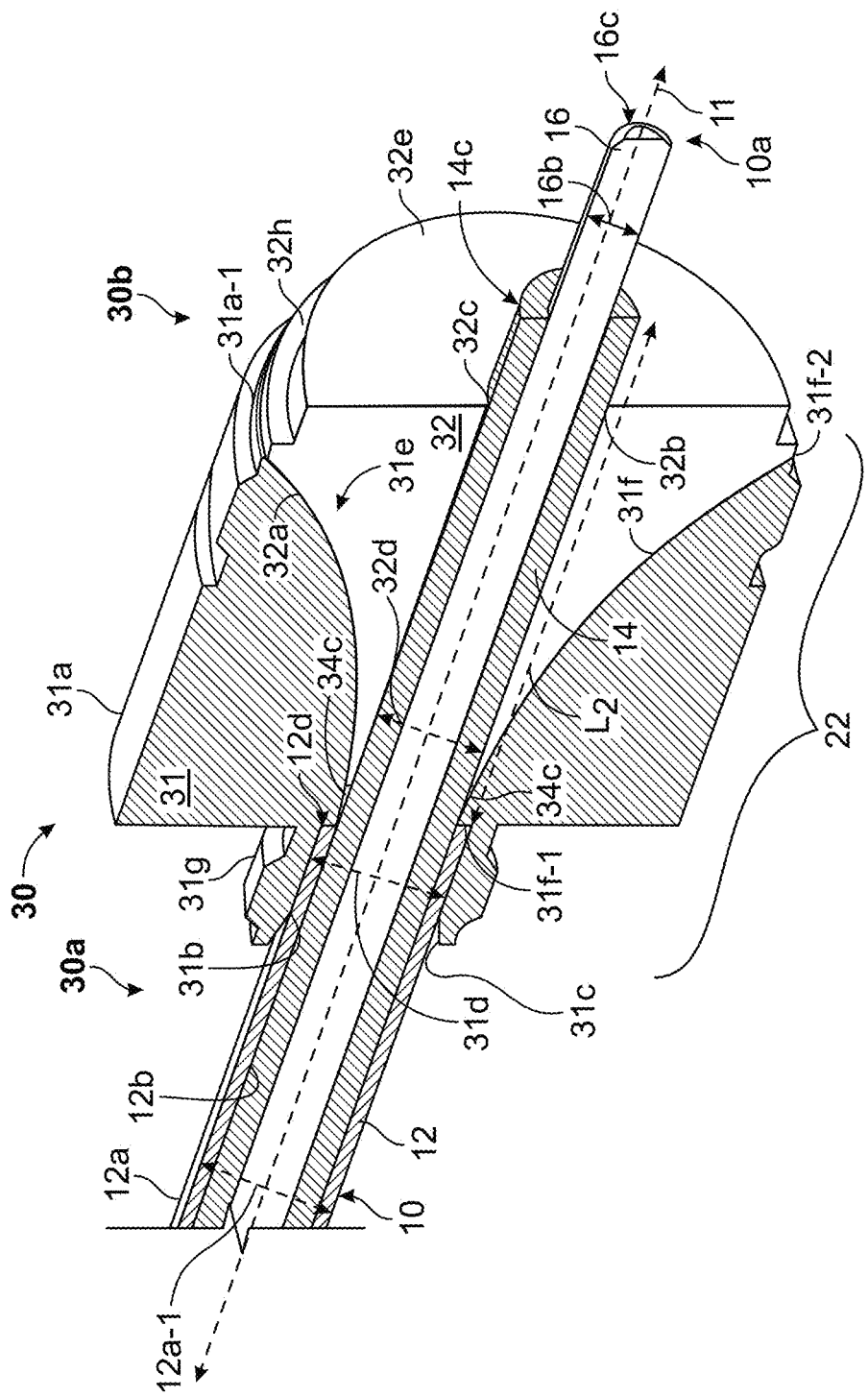
FIG. 5A illustrates a longitudinal cross-sectional view of a stress control cone, similar to that shown in FIG. 4A mounted around a terminated end of a TEPC.

Stress Cones:

Referring now to FIGS. 4A, 4B, 5A, 5B and 6, to minimize or mitigate these TEPC termination end voltage stress effects, stress control cones 30 have been developed that can quickly and easily be attached over the terminal end 12d of a stripped ESP cable 10 outer sheath 12. Referring now to FIGS. 4A and 4B there is shown a stress cone 30 for use proximate (over) the TEPC termination end 12d of cable 10.

The stress control cone 30 comprises a stress cone inner or first end 30a, a stress cone outer or second end 30b opposite the first end 30a, a metal stress cone outer housing 31, a stress cone outer housing outer surface 31a, and a stress cone annulus segment 31b (of ID 31d ($ID_2$) essentially equal to ESP cable $OD_3$ 12a-1) extending inwardly along axis 11 a desired length from the stress cone first end 30a. This stress cone annulus segment 31b receives the terminated end 12d of the ESP cable/TEPC 10 terminal end within the stress cone annulus segment 31b. The stress cone 30 further comprises an outer housing annulus opening 31c leading into annulus 31b. The outer housing annulus opening may be outwardly beveled if desired to facilitate insertion of the cable 10. The annulus 31b extends inwardly along axis 11 for a desired length and is terminated by an inwardly-oriented concentric metal shoulder 31f-1. The shoulder 31f-1 extends radially inwardly about axis 11 for a length approximately (but preferably) equal to the width 12b-2 of the ESP cable metal outer sheath tube 12 (i.e., the sheath width defined as the difference between the $ID_1$ and the $OD_3$) to create an annular inside diameter 32d ($ID_3$) across the opening of shoulder 31f-1 which is approximately equal to the outer diameter 12b-1 ($OD_3$) of the ESP tube insulation layer 12.

The metal shoulder 31f-1 serves as a metal-to-metal end contact stop when the stripped ESP cable metal termination end face 12d is inserted into the first end 30a of the stress cone 30 and abutted against the face of metal shoulder 31f-1. The shape of the face of metal shoulder 31f-1 and the face of the cut or terminated metal end 12d of the ESP cable sheath 12 are designed to closely and tightly mate or match with each other when the cable 10 is inserted into the stress control cone 30 annulus 31b. Typically, the cut end 12d of the ESP sheath 12 is cut in a manner which leaves a 90° surface, in which case it is preferred that the shoulder 31f-1 likewise have a corresponding 90° mating surface. In one embodiment, the surface of the face of the termination end 12d of the sheath 12 and the surface of the face of shoulder 31f-1 are mated together in a manner that maximizes the area of contact between the two metal contacting faces to minimize any voids being present between the contacting metal faces when the ESP cable is inserted into and secured to the stress control cone 30. Preferably, the metal sheath 12 of the EPC cable 10 is cut using a technique that results in a clean, smooth 90° end surface 12d, 12e, 12f to mate with a corresponding 90° clean, smooth shoulder face 31f-1. In one embodiment, when mated together, the mated faces are devoid of air. In other embodiments, the mated surfaces are devoid of surface irregularities.

When inserted into the stress control cone 30, the ESP cable insulation layer 14 (covering conductor core 16) (i.e., the desired terminal length of exposed insulation layer ($L_2$)) is permitted to extend beyond the shoulder 31f-1 along axis 11 through the stress control cone 30 insulation chamber 31e and out the outer or second end 30b of the stress cone. A coupler or tube fitting 31g is located at the stress cone first end 30a about the annulus 31b for securing the stress control cone annulus segment 31b to the outer surface 12a of the ESP cable protective sheath 12. When so coupled, the metal terminal end 12d of the ESP cable 10 sheath 12 is securely abutted against the metal shoulder 31f-1 of the stress cone 30. As will be understood by those having the benefit of the present disclosure, coupler 31g can be any suitable connector, preferably one that permits ease of insertion of the cable and ease of fastening of the cable to the stress control cone, such as, for example, compression tube fittings, swage-style tubing fitting and the like that avoid indentation of the sheath into the underlying insulation layer 14. The use of conventional tubing fittings allows for rapid installation and removal.

The stress cone housing 30 further comprises a contained internal insulation chamber 31e defined by inner surface 31f extending symmetrically about the axis 11 from a first end coterminous with the shoulder 31f-1 to a second end 31f-2 proximate the outer or second end 30b of the stress cone 30. The shape defined by the surface 31f can be varied, but preferably remains symmetrical about the axis 11 at any point between its first and second ends. The internal insulation chamber 31e houses an insulation material section 32 designed to envelope the insulation layer 14 (i.e., the portion of the desired terminal length ($L_2$) of the exposed insulation layer 14) of the TEPC 10 extending axially therethrough along axis 11. The stress cone insulation material 32 envelopes the insulation layer 14 (the part of length ($L_2$) extending therethrough) of the TEPC between the outer surface 14a of the TEPC insulation layer 14 and the interior surface 31f of the stress cone housing 31 insulation chamber 31e) when the terminated and stripped cable 10 is attached to the stress cone 30.

In one embodiment, the shaped of the insulation chamber 31e (defined by its inner surface 31f, is a conically-, frustoconically-, trumpet-, bell-like- or similarly-shaped internal space (generally referred to as a conically shaped space) defined by inner surface 31f extending symmetrically about the axis 11 from a first end proximate the shoulder 31f-1 to a second end 31f-2 proximate the outer or second end 30b of the stress cone 30. In the embodiment depicted in FIGS. 4A, 4B, 5A, 5B and 6, the generally curved conically shaped surface 31f has its narrowest end terminating at the shoulder 31f-1, and increasing symmetrically along the axis 11 to its widest end 31f-2 proximate the second end 30b of the stress cone 30. In this embodiment, the cross-sectional profile of surface 31f outwardly curves away from the axis 11 as it progresses between ends 31f-1 and 31f-2. In another embodiment, this profile could also comprise a straight line between ends 31f-1 and 31f-2. Although depicted herein as a generally conically shaped surface 31f, other surface geometries could be used for the internal insulation chamber 31e. For example, the surface 31f could be any geometry that provides a smooth distribution of the electric field in the termination zone 22, or one that reduces high localized electric field stress levels in the termination zone 22. Ideally, the shape of inner surface 31f is symmetrical about axis 11 at any point along its length between ends 31f-1 and 31f-2.

In this embodiment, an insulative material 32 fills the stress cone interior space 31e defined by surface 31f and further comprises an outer surface 32a in contact with, interacting with, or adhered to the housing inner surface 31f, and an insulation hollow annular core 32b located about the axis 11 and extending through the insulation material 32 from proximate the shoulder 31f-1 to the stress cone second end 30b. The insulation annular core 32b comprises an inner diameter 32d sized to be capable of snugly receiving the outer diameter 12b-1 ($OD_3$) of the insulation layer 14 (containing conductor core 16) of the ESP cable 10 between the insulation annulus first end opening 32f and the insulation annulus second end opening 32c. In a preferred embodiment, the insulation layer 14 (containing conductor core 16) (part of length $L_2$) remains axially aligned and centered along axis 11 within the stress cone 30. In one embodiment, the insulation cone material annulus 32b maintains the insulation layer 14 (containing conductor core 16) axially aligned and centered along axis 11 within the stress cone 30. In this embodiment, the insulation material also comprises an end face 32e at the stress cone second end 30b, the end face 32e further comprising an annular opening 32c of the insulation annulus 32b.

In one embodiment, the insulation material 32 is contained and held within the stress cone 30 via a stress cone outer housing end or retaining cap 31h. In one embodiment, such as shown in FIG. 5B, the cap 31h comprises an apertured end 31h-1 forming a radially inwardly protruding concentric lip 31h-2. This lip 31h-2 rests up against corresponding lip or shoulder 32h on the insulation material insert 32 to retain it in place within the insulation chamber 31e. The retainer cap 31h may be attached to the stress cone outer or second end 30b by any number of suitable connections, such as, for example, a snap on connection, a threaded connection, an interference fit, a welded connection or an adhered/cemented connection or the like. For example, housing outer surface 31a could further comprise threads or grooves (such as one or more concentric grooves 31a-1) for interfacing with corresponding structure on the inside surface of the cap 31h to facilitate fixing the cap into place.

In an alternative embodiment, the retainer cap 31h is of similar construction differing in that its apertured opening centered about axis 11 is sized to permit the insulation layer 14 of the cable 10 to extend therethrough, similar to that depicted in FIG. 8B (described below) while serving to retain the insulation material 32.

When the insulation material 32 comprises a machined or molded insulation structure that is insertable into the second end 30b of the stress cone housing 31 defined by inner surface second end 31f-2 (and secured in place with end cap 31h) it may be difficult to machine or fabricate the insulation material edge 32f down to essentially zero without chipping, or otherwise creating non-symmetrical discontinuities in the area where the insulation would meet the shoulder 31f-1. Therefore, the insertable insulation material 32, once inserted or installed into the stress cone insulation chamber 31e may present a small gap 34c existing between the shoulder 31f-1 and the edge 32f of the insulation material 32 when installed within the insulation chamber 31e. In these instances where a gap or irregularity may exist, it is desirable to fill the gap 34c (or irregularities) with an insulative material such as a dielectric material, such as, for example, a dielectric fluid, or grease, epoxy, or other insulative filler material. This insulative filler material would then fill the gaps or irregularities when the cable insulation layer 14 extends therethrough.

Similarly, surface irregularities may also exist at other locations along the ground plane transition interface 34. Also, the surface or interface between housing internal insulation chamber surface 31f and the insulation material (e.g., insulation outer surface 32a) should be devoid of any air. Therefore, in one embodiment, where the insulation layer 32 is an insertable insulation material, a fluid-like insulator substance is placed between housing internal insulation chamber surface 31f and the insulation material (e.g., insulation outer surface 32a) at the time of installation to remove air from this interface area and to otherwise fill any irregularities with an insulative material.

Figure 6:
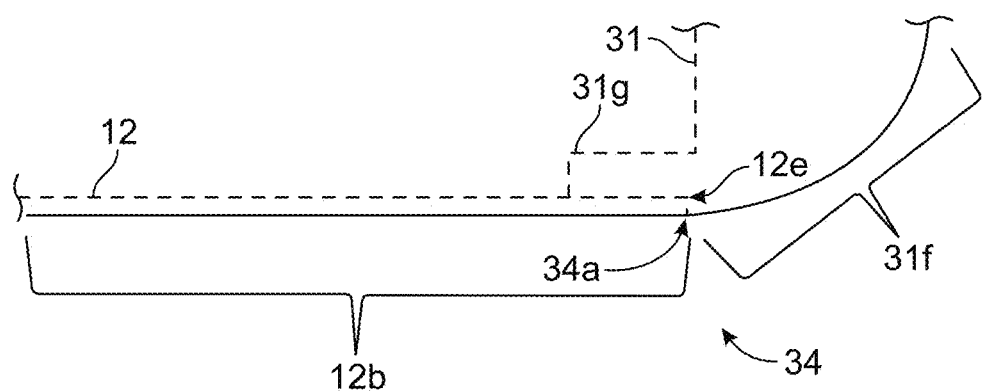
FIG. 6 schematically depicts the terminal end of a cut metal TEPC sheath securely mounted within a metal stress control cone housing to create a smooth, continuous surface between the interior metal ID surface of the sheath and the interior metal surface of the stress control cone.
Figure 7A:
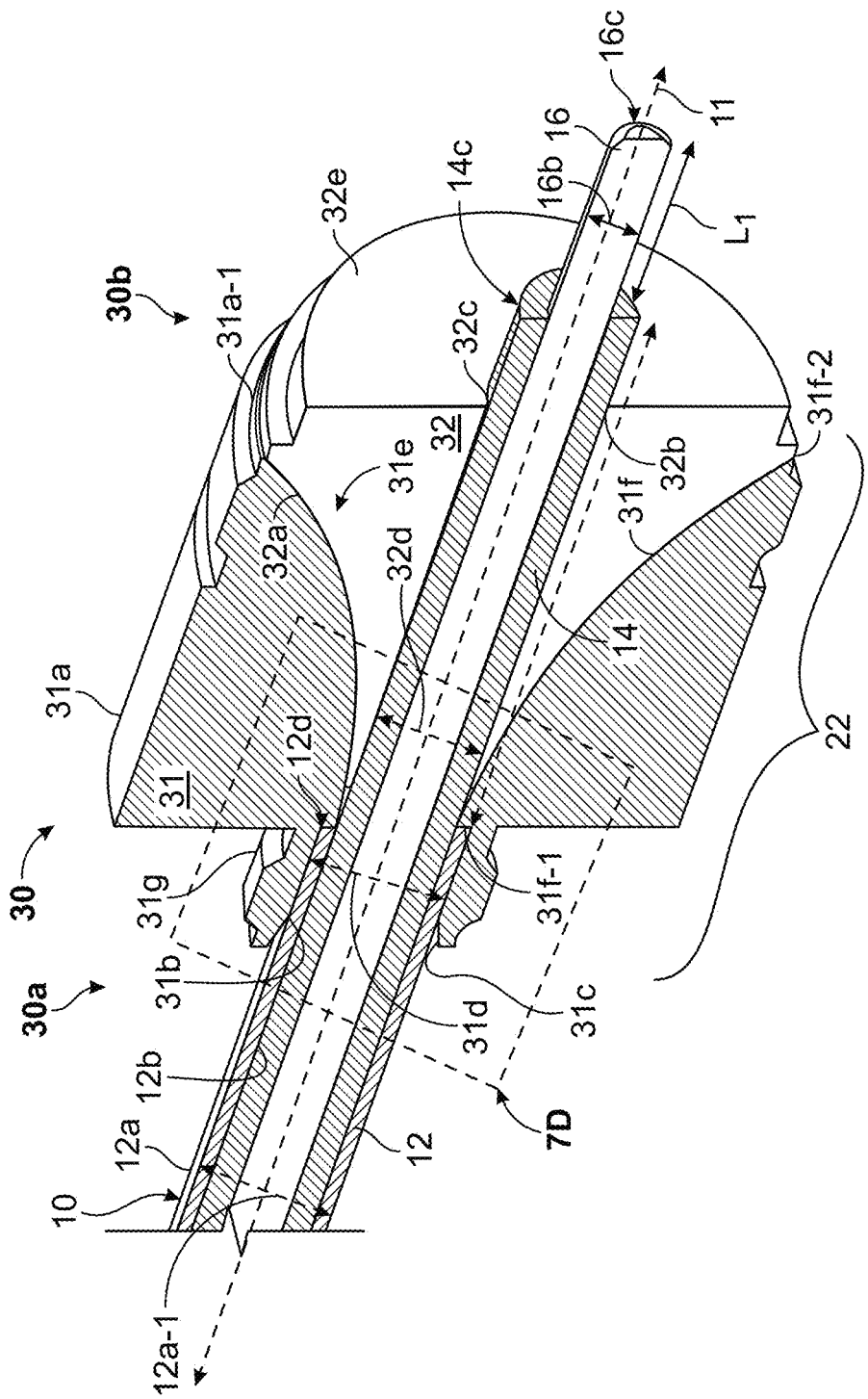
FIG. 7A illustrates a longitudinal cross-sectional view of a stress control cone, similar to that shown in FIG. 5 mounted around a terminated end of a TEPC.
Figure 7B:
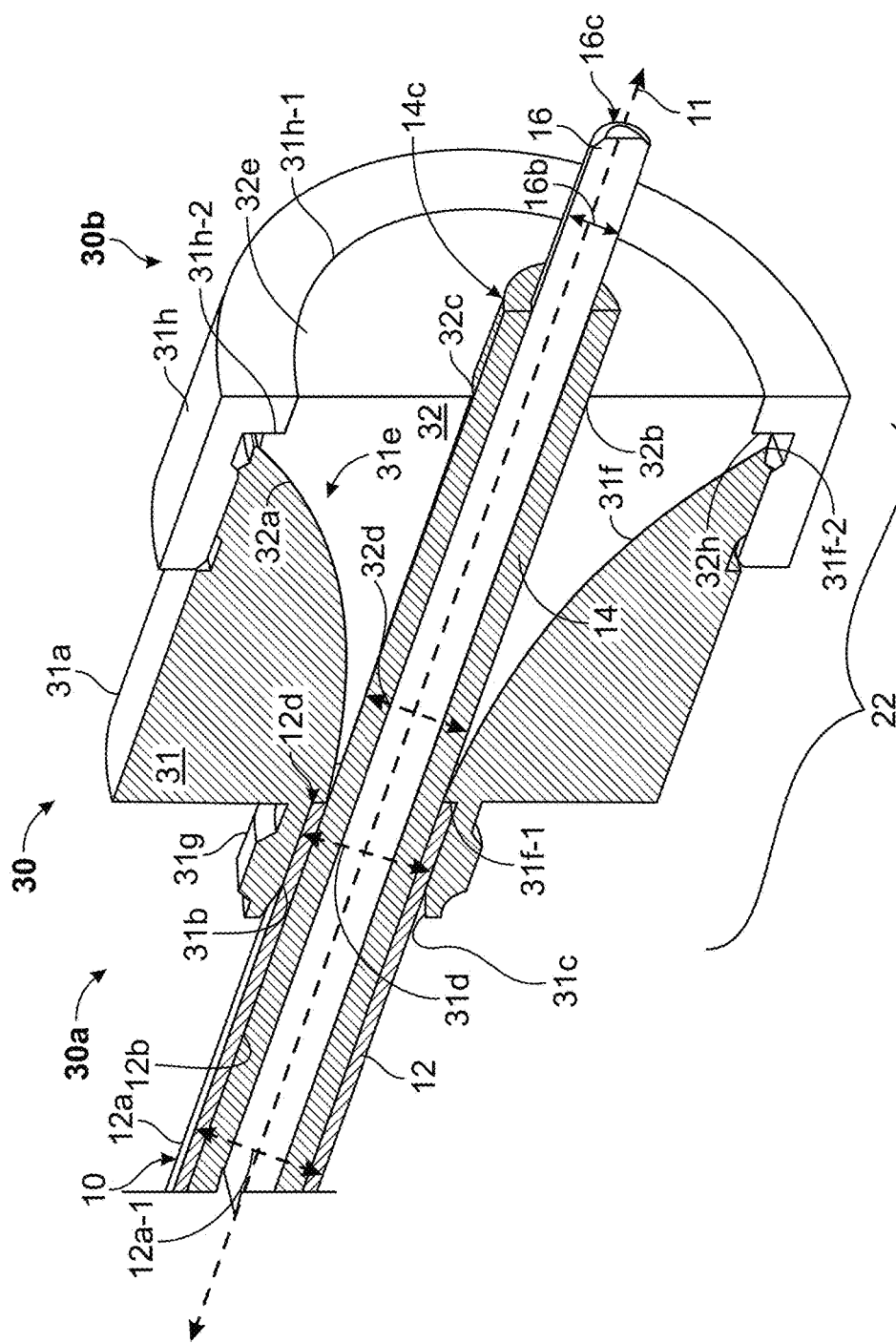
FIG. 7B illustrates the stress control cone of FIG. 7A shown with the retaining or end cap attached.
Figure 7C:
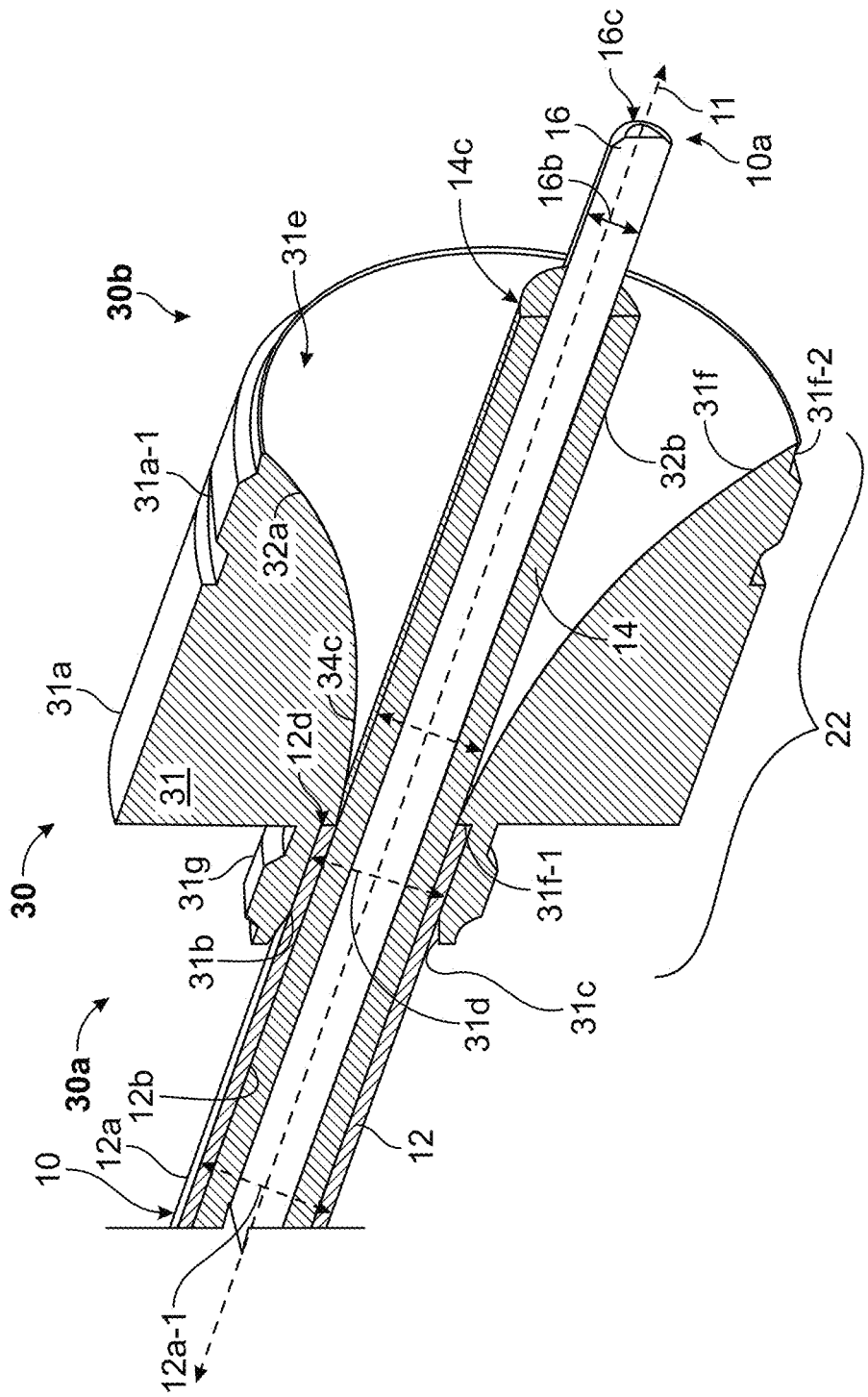
FIG. 7C illustrates the stress control cone of FIG. 7A shown without the insulation material in place.
Figure 7D:
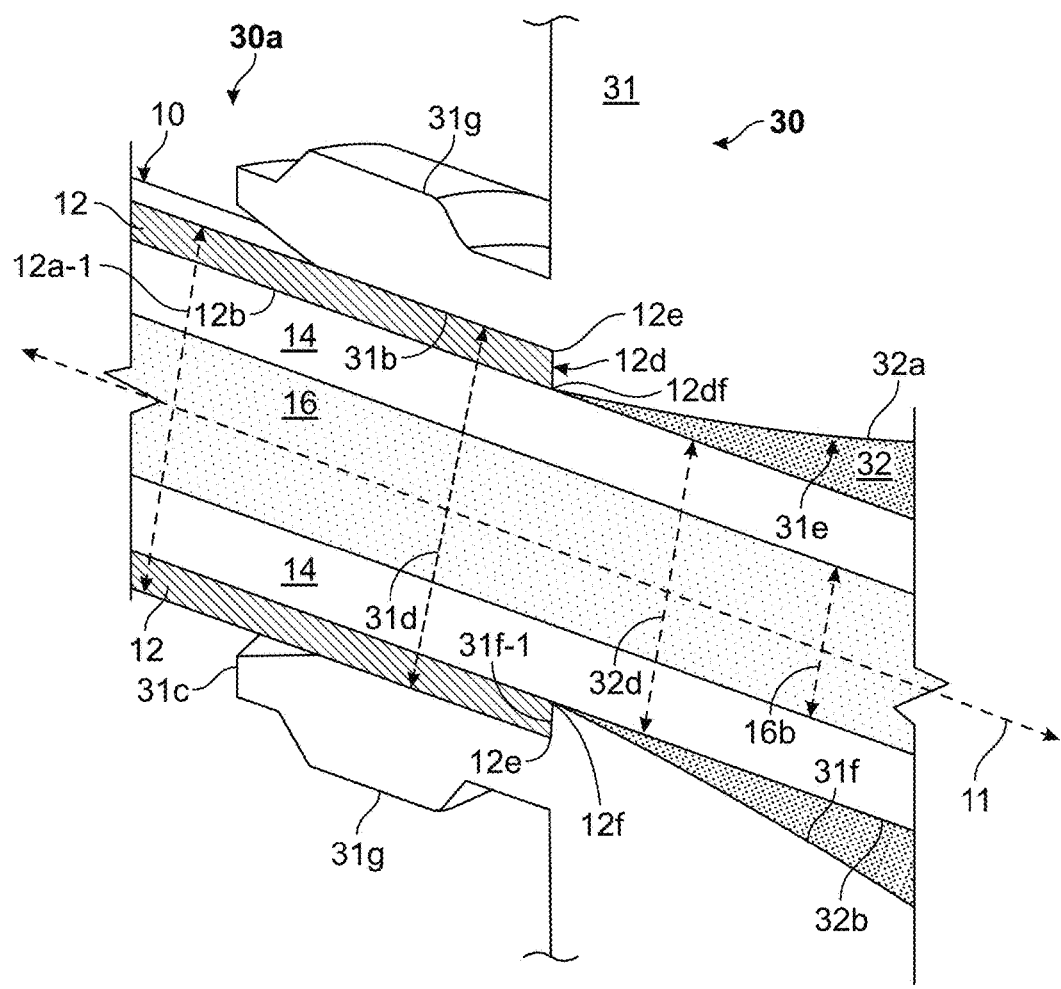
FIG. 7D illustrates a partial enlargement of area 7D from FIG. 7A.
Figure 7E:
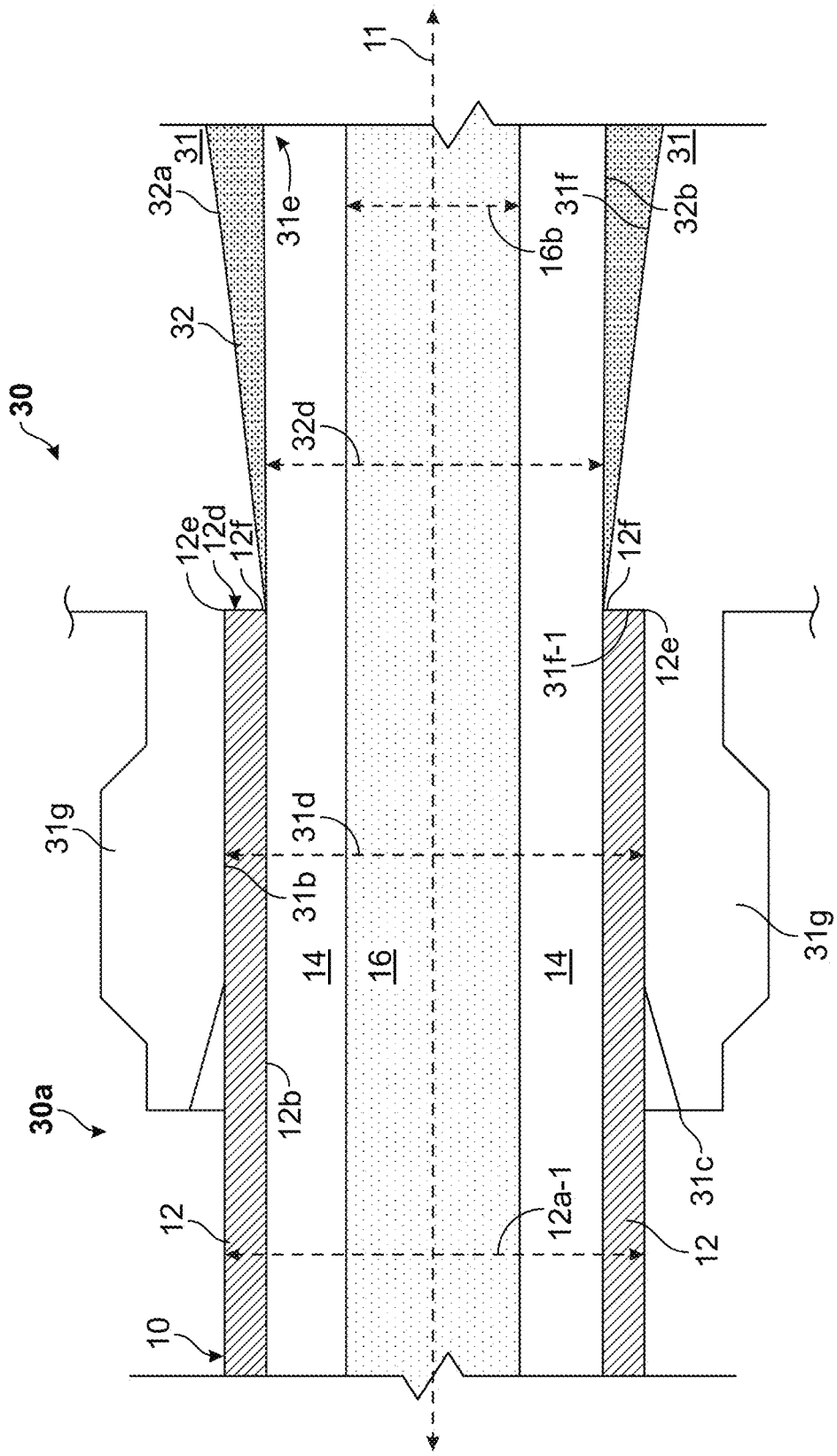
FIG. 7E illustrates a side view of FIG. 7D.

When the stripped ESP cable 10 is inserted into the stress control cone 30, the metal terminated end 12d of the cable sheath 12 abuts against the metal shoulder 31f-1 of the stress control cone. When inserted in such metal-to-metal abutting relationship, it is desired that the metal inside diameter surface 12b of the cable sheath 12 forms a tight, smooth, continuous transition to the inner metal surface 31*f* (at point 34*a*) of the stress control cone 30. This smooth, continuous surface (created by the connected surfaces 12*b* and 31*f*, including from points 34*a* to 34*b*) creates a smooth ground plane transition line 34 between cable sheath inner diametrical metal surface 12*b* and the stress cone insulation chamber inner radially symmetrical surface 31*f*. FIG. 6 schematically depicts this continuous transition surface 34. In preferred embodiments, it is desirable to eliminate or prevent any air from existing along transition line 34 between the stress cone inner surface 31*f* and the insulation material outer surface 32*a*. In these instances, an insulative material such as a dielectric material such as, for example, a dielectric fluid, or grease, epoxy, or other insulative filler material can be applied or added at the time of installation to displace any air with such insulative material.

Referring now to FIGS. 7A, 7B, 7C, 7D and 7E, there is illustrated a stress control cone 30 similar to that shown in FIG. 5 mounted around a terminated end of a TEPC. This embodiment depicts where the stress cone insulation material completely fills the insulation space 31*e* without leaving a gap 34*c* as shown in FIG. 5.

Figure 8A:
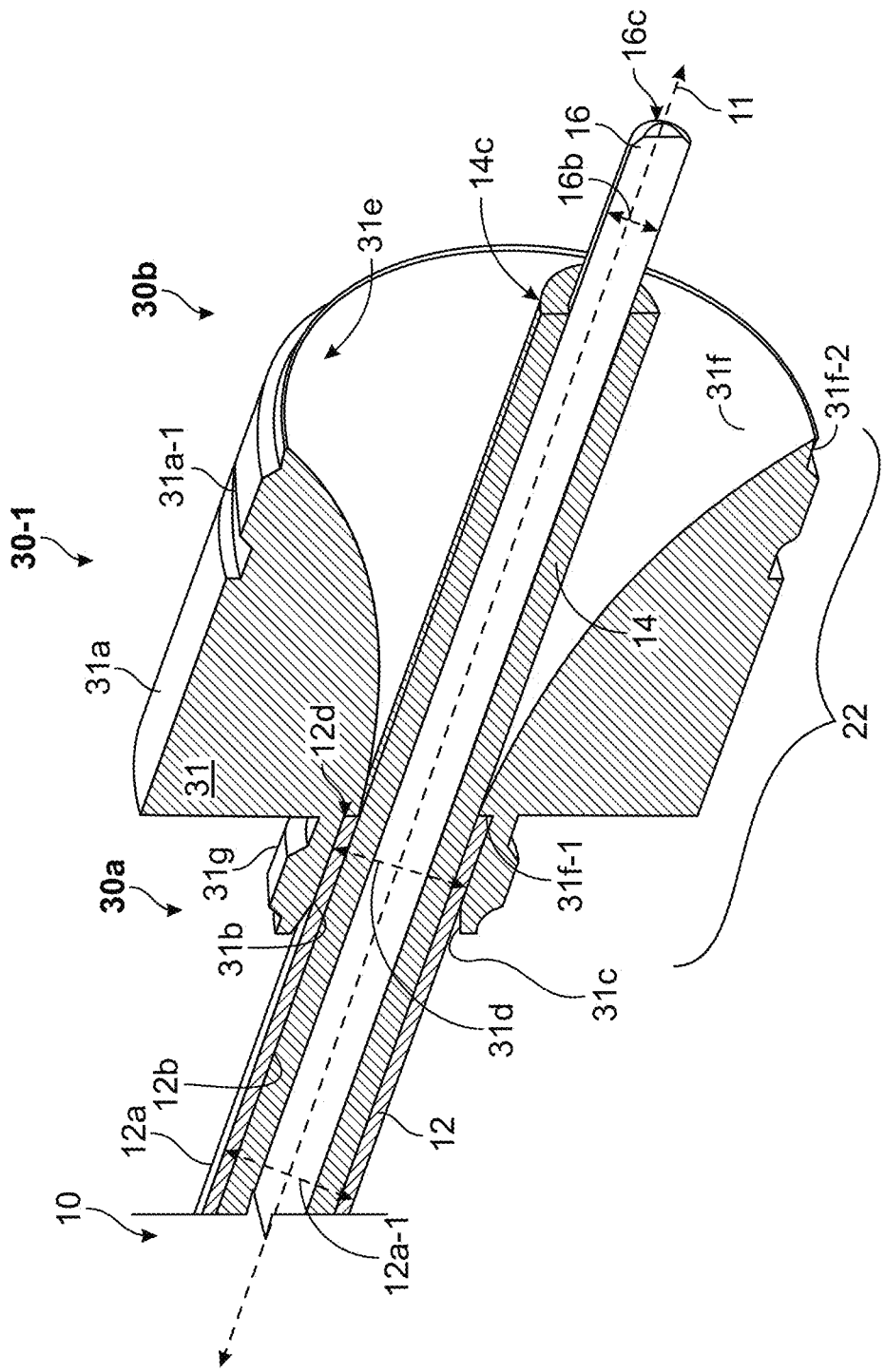
FIG. 8A illustrates a longitudinal cross-sectional view of another stress control cone, similar to that shown in FIG. 4A mounted around a terminated end of a TEPC where the insulation layer comprises an insulative fluid.
Figure 8B:
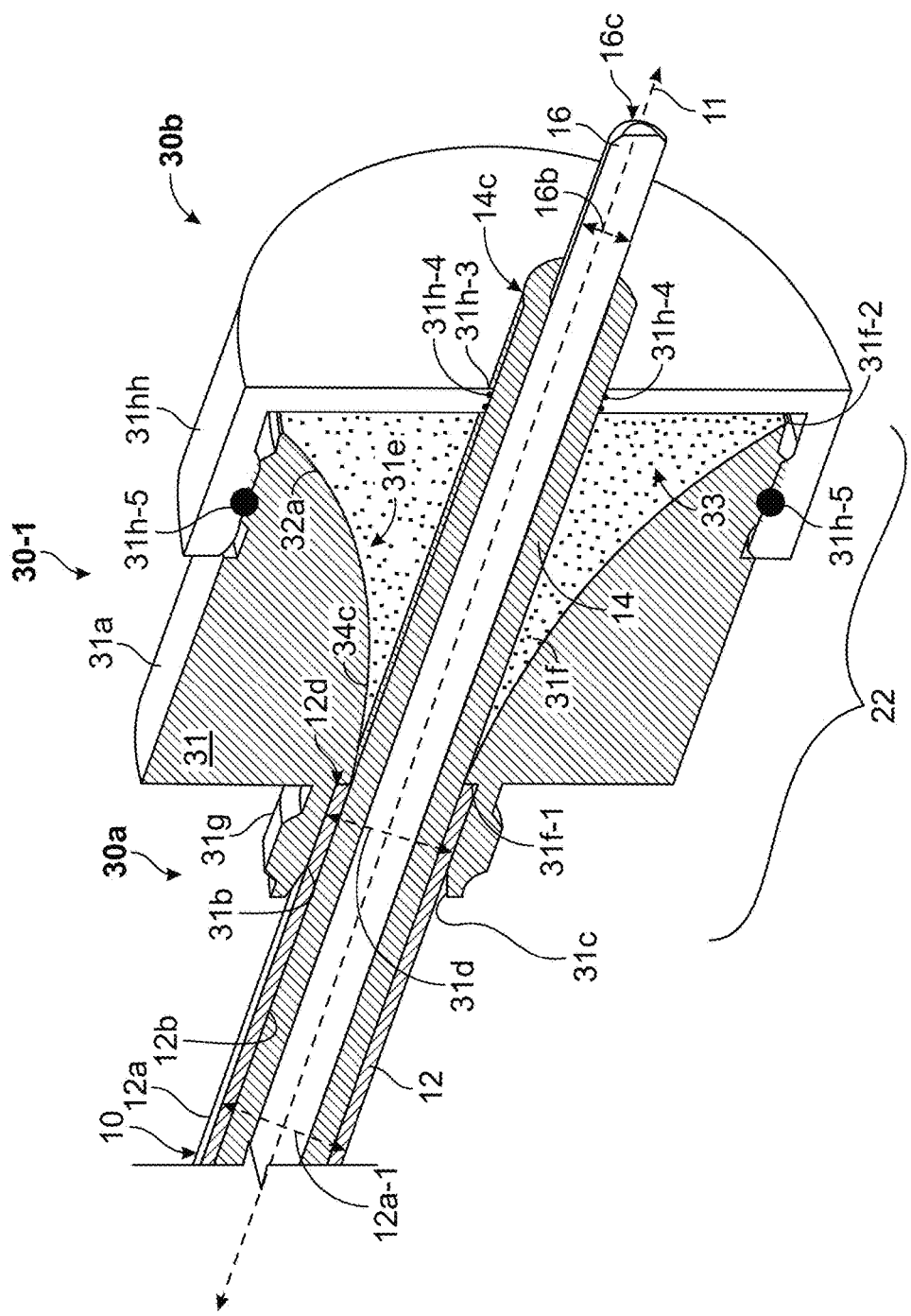
FIG. 8B illustrates the stress control cone of FIG. 8A shown with the retaining or end cap attached.

Referring now to FIGS. 8A and 8B, in another embodiment, the insulation layer comprises an insulation fluid 33, such as a dielectric fluid, dielectric gas, or grease, or the like filling the insulation chamber 31*e* and surrounding the insulation layer of 14 of the TEPC cable passing therethrough along axis 11. In this embodiment, the retaining cap 31*hh* further comprises an aperture 31*h*-3 centered about axis 11 to permit the stripped ESP cable insulation layer 14 (with conductor core 16) to extend therethrough along axis 11. The retainer cap 31*h* may be attached to the stress cone outer or second end 30*b* by any number of suitable connections, such as, for example, a snap on connection, a threaded connection, a welded connection or an adhered connection, or the like as described in connection with earlier embodiments. In this embodiment, the retainer cap 31*h*-1 further comprises suitable sealing gaskets, o-rings, or other seals, including polymeric, epoxy, adhesive, and the like in locations such as depicted by e.g., 31*h*-4 around aperture 31*h*-3, and 31*h*-5 around opening 31*f*-2.

Insulator Materials:

In one embodiment, the cone insulation chamber 31*e* must contain an insulating material 32, 33 with a dielectric breakdown in excess of the maximum electric field occurring between the conductor 16 and the stress cone inner surface 31*f*. In other embodiments, the insulator material comprises a combination of one or more insulating materials. Many insulator materials could be used, including insulator materials used with high voltage cables. The insulator material could comprise one with a controlled permittivity. In one embodiment, the insulation material 32 is the same as or similar to the insulation material used in the cable insulation layer 14, or is an insulative material that closely matches the properties of the cable insulation 14. Suitable insulator materials can include engineered polymers, perfluoroalkoxy (PFA), polyethylenes (PE), cross-linked polyethylenes (XLPE), ethylene propylene diene M-class (EPDM), ethylene propylene rubber (EPR), expanded polytetrafluoroethylene (ePTFE), corona-resistant PTFE, plastics, dielectric materials, dielectric fluids (including gases and liquids), grease, epoxy, urethane, polyetherimide, acrylic, PVC, polycarbonate, silicone rubber, polyester, polyamide, polyimide, polyamine, polypropylene laminated paper (PPLP), PTFE, oil, gas, perfluorinated liquids, composites, ceramics, porcelain, and other suitable insulator materials, and combinations thereof. Preferably, air should not be used as the dielectric.

Figure 9:
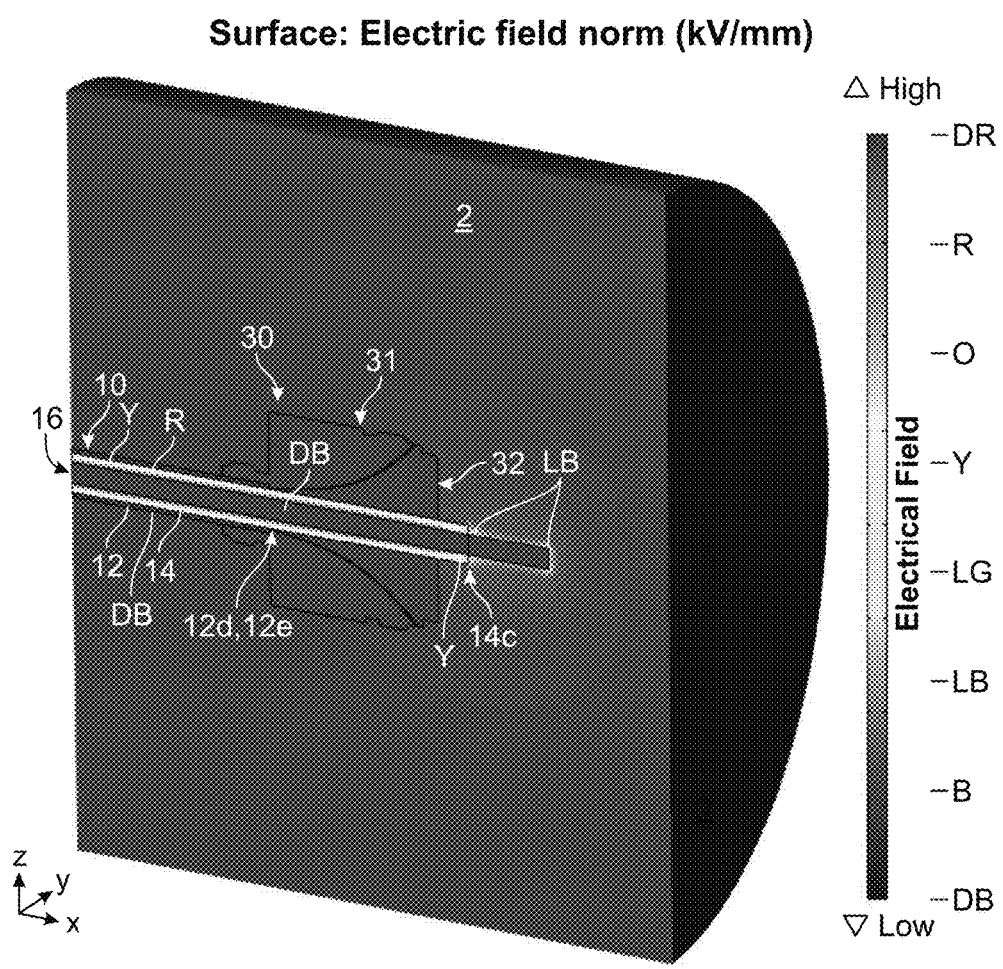
FIG. 9 illustrates the improved electric field strength (reduced to baseline levels) created in the region of a field termination (cut tube) of a TEPC employing a stress control cone according to embodiments of the present disclosure.

When attached to the end of a terminated tube 12*d*, the stress cones 30 such as those described herein greatly reduce the field stress concentration by providing a smooth ground plane transition 34 from the cut end 12*d* to the surrounding environment. Preferably, the insulated core (14, 16) remains centered along axis 11 as it passes through the insulation chamber 31*e*. The above-described features smooth the electric field, prevent arcing (a risk when air is present) and centers the wire (14, 16) (further ensuring a smooth transition). The resulting improvement in the electric field strength in the tubing terminations employing the stress cone 30 is shown in FIG. 9 (reduced to baseline level). As shown, the electric fields show no concentration at the tubing end 12*d*, 12*e*, 12*f*.

The stress cones 30 described herein would be applied at any point in the ESP system where the insulated wire (14, 16) (without the tube sheath 12) must be accessed. This would typically include a surface junction box or surface connector.

Figure 10:
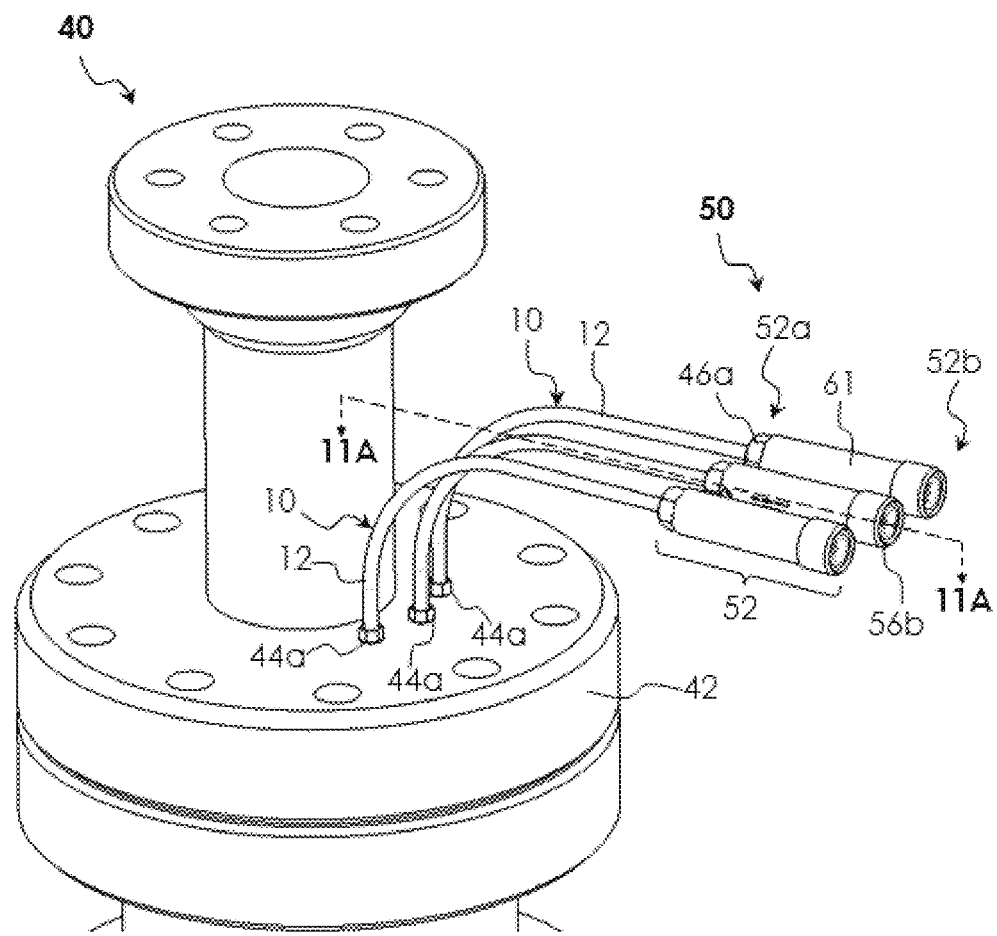
FIG. 10 illustrates a portion of an exemplary wellhead bonnet section illustrating the use of metal-to-metal tubing fittings and pressure control assemblies employing a stress control zone according to another embodiment of the present disclosure.
Figure 11A:
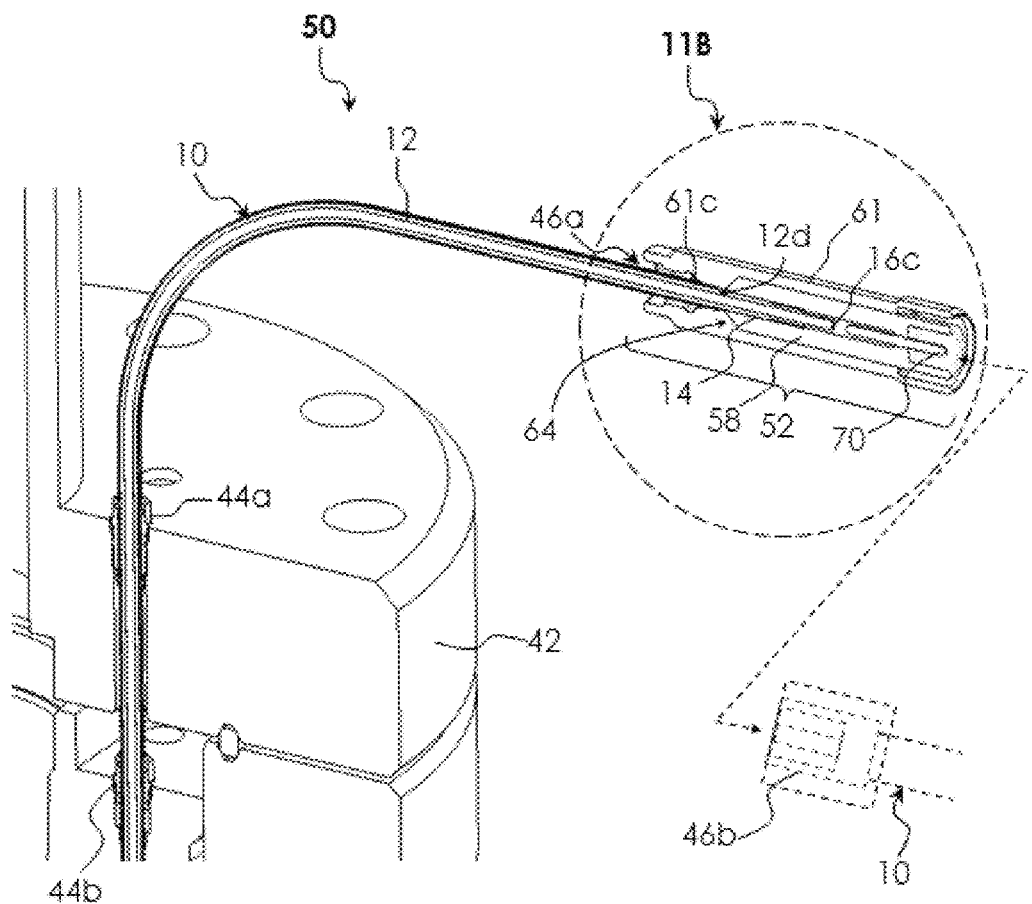
FIG. 11A illustrates a partial cross-sectional view taken along lines 11A-11A of FIG. 10.
Figure 11B:
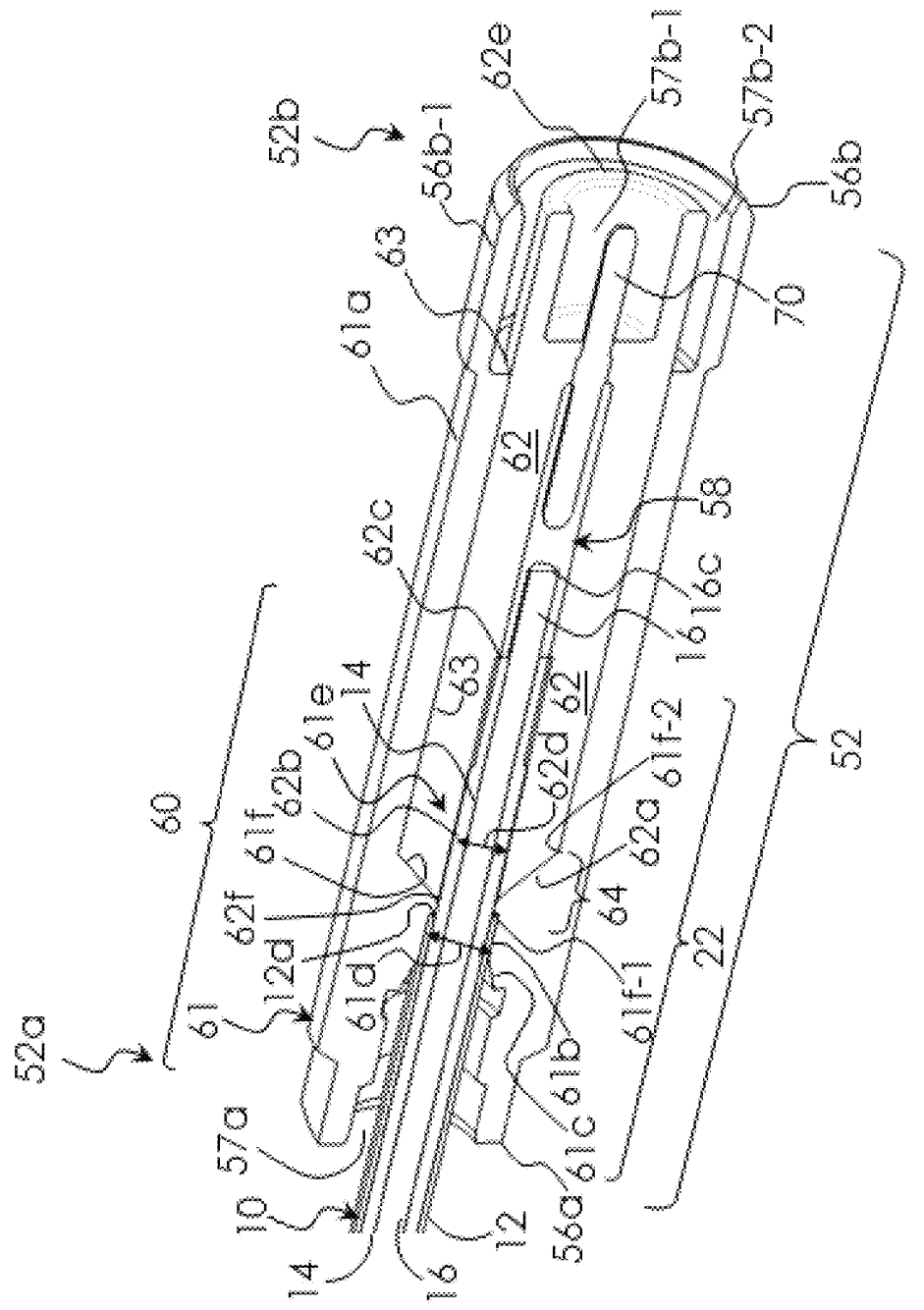
FIG. 11B is an enlarged view of section 11B of FIG. 11A.

Referring now also to FIGS. 10, 11A and 11B (in connection with the above teachings), there is also depicted an exemplary high-pressure connector assembly 52 (employing a stress control zone 14) for use with ESP cables 10. FIG. 10 illustrates a portion of an exemplary wellhead bonnet section 40 having a wellhead (bonnet) body 42 and a wellhead connector outlet section 50. Each ESP cable 10 is secured with metal-to-metal high pressure fittings 44*a* as it passes through the bonnet body 42, and is secured with metal-to-metal high pressure fittings 44*b* when passing through other sections below the bonnet, such as the tubing hanger. The use of these metal-to-metal high pressure fittings with ESP cable enhances the safety of the connection at high pressure—creating a high-pressure seal which prevents hydrocarbons, liquids or gases from migrating to the outside region of the pressure fittings 44*a*, 44*b*.

In this example embodiment, each of the employed ESP cables 10 (three shown here as an example) emerge from the wellhead bonnet 42 and then are connected to, e.g., a surface power supply or other desired connection. To facilitate these connections, the present disclosure also provides a wellhead high pressure connector assembly 52 (having first and second ends 52*a*, 52*b* respectively) that can receive a terminal end 16*c* of the stripped ESP cable 10. As illustrated in FIG. 10, a high-pressure metal-to-metal fitting 46*a* is used to secure the cable 10 into the high-pressure connector assembly first end 52*a* via a swage-type (or other suitable) metal-to-metal high pressure fitting. At the second end 52*b* of the high-pressure connector assembly 52, another high-pressure fitting 46*b* can be secured for purposes of connecting the ESP cable 10 core terminal end 16*c* to further ESP cable 10. For ease of viewing, the structure of fitting 46*a* is not shown in FIGS. 11A and 11B (but would interface in mated sealed connection fashion with the wellhead connector assembly first end high pressure fitting 56*a*). It will be understood that fitting 46*a* would comprise a threaded nut and a ferrule (or the like) about the outer diameter of the cable for insertion into the receiving chamber 57*a* of fitting 56*a* to create a pressure seal between the ferrule, the cable outer sheath 12 and the wellhead connector assembly first end high pressure fitting 56*a*. Fitting 46*b* is generally depicted in a disconnected fashion (but would interface in mated sealed connection fashion with the wellhead connector assembly second end high pressure fitting 56*b* and its first and second receiving chambers 57*b*-1, 57*b*-2). For example, high pressure fitting 56b could be externally threaded with threads 56b-1 (details not shown) to permit fitting 46b to be secured via a threaded pressure connection.

Much like with the above disclosure regarding the stress control cone 30, the pressure control assembly 52 contains a stress control cone section 60 providing an electrical stress relieving geometry zone or stress cone geometry section 64. The pressure control assembly 52 further comprises a metal body or housing 61 having an outer surface 61a, a stress cone annulus segment 61b (of first ID=to ESP cable OD) for receiving ESP cable 10 with outer sheath (similar to element 31b). The pressure control assembly 52 also comprises a stress cone outer housing annulus opening 61c (similar to element 31c), a stress cone outer housing annulus inner diameter 61d ($ID_2$) (similar to element 31d), a stress control internal insulation chamber 61e (similar to element 31e), a stress cone outer housing insulation chamber inner surface 61f (similar to element 31f) in contact with insulating cone material outer surface 62a to create preferred stress cone geometry in stress relieving geometry section 64, a stress cone outer housing coupler shoulder 61f-1 proximate a first the end 62f of inner insulation area 61e (e.g., conical) surface 61f, a stress cone outer inner insulation area (e.g., conical) surface second end 61f-2. The geometry of the inner insulation area surface in the stress cone zone 64 serves to improve the electric field strength created in the region of a field termination (cut tube) of the TEPC—to reduce the electrical stress in this area.

The wellhead high pressure connector 52 further comprises a stress cone inner insulation cone material 62 similar to insulation material 32 described above, having an insulation cone material outer surface 62a for interacting with outer housing inner surface 61f, an insulation cone material annulus 62b (similar to 32b) for receiving stripped ESP cable 10, an insulation cone material second end face annulus opening 62c, an insulation cone material annulus inner diameter 62d ($ID_3$) (similar to 32d), an insulation material end face 62e within pressure fitting 56b, an insulation cone material annulus first end opening 62f. In this embodiment, the insulation material 62 is preferably formed from a ceramic material that is brazed to the inside surface 61f of the metal housing 61 to create a pressure seal interface 63 between the metal housing inner surface 61f and the insulation material outer surface 62a. In another embodiment, the insulation material comprises a glass material also forming a sealed interface 63 between the metal housing inner surface 61f and the insulation material outer surface 62a. This high-pressure connector assembly also contains a brazed ceramic or glass sealed conductor 70 axially aligned with and for contacting at its inner end the cable core terminal end 16c. As will be understood, there also exists a socket-to-socket connection 58, the details of which have been removed for clarity. This socket-to-socket connection creates the contact between cable core terminal end 16c and the first end of the conductor pin 70. The opposite end of conductor 70 extends as a pin into the first pressure fitting receiving chamber 57b-1 where it can then interface with a high-pressure fitting 46b that would be attached to assembly second end 52b. The metal-to-metal, brazed ceramic-to-metal, or glass-to-metal interfaces create a high=pressure seal which prevents hydrocarbons, liquids or gases from migrating to the outside region of the connector 52.

While the apparatus and methods of this invention have been described in terms of preferred embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art. While the apparatus and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

We claim:

1. A stress cone for use on a terminated end of a tubing encapsulated power cable (TEPC) used in surface applications of a subsurface well power system employing electric submersible pumps, the TEPC comprising a central conductor section of a first outer diameter $OD_1$, a TEPC insulation layer coaxially surrounding the conductor and having a second outer diameter $OD_2$, and a metal tubing sheath coaxially surrounding the TEPC insulation layer, and having an internal diameter $ID_1$ equal to the second outer diameter $OD_2$, a third outer diameter $OD_3$, and a sheath width defined as the difference between the $ID_1$ and the $OD_3$, the terminated end of the TEPC creating a sheath termination end face, the TEPC insulation layer and conductor section extending for a desired length beyond the sheath termination end face, the conductor section extending for a desired length beyond a termination end of the TEPC insulation layer, the stress cone comprising:

a. a housing comprising an inlet end and an outlet end oriented about a longitudinal axis, the inlet end capable of receiving the sheath terminated end face, the outlet end capable of permitting the TEPC insulation layer termination end to extend therethrough and out of the housing;

b. an internal insulation chamber located within the housing between the inlet end and the outlet end and comprising an internal metal surface oriented about the axis, the internal metal surface defining a desired shape about the axis, the TEPC insulation layer capable of extending therethrough;

c. a TEPC tubing coupler section axially aligned about the axis at the housing inlet end comprising i. an annular section oriented about the axis of an inside diameter $ID_2$ equal to the TEPC sheath $OD_3$ having a coupler first end opening and a coupler second end opening of a smaller inside diameter $ID_3$ equal to the TEPC insulation layer OD$_2$, the coupler first end opening capable of receiving the terminated end of the TEPC sheath therethrough, the coupler second end opening leading into the internal insulation chamber and capable of receiving the TEPC insulation layer therethrough, the insulation chamber capable of receiving the desired length of TEPC insulation layer therethrough;

ii. a radially inwardly protruding metal shoulder at the coupler second end comprising a shoulder mating surface facing toward the coupler first end opening, the shoulder mating surface having a depth equal to the sheath width and capable of mating with the sheath termination end face when the terminated TEPC sheath is inserted into the annular section, the shoulder also defining the coupler second opening;

iii. a tubing coupler mechanism capable of securing the TEPC within the coupler annular section; and d. an insulation material contained within the internal insulation chamber capable of insulating between the TEPC insulation layer OD$_2$ and the insulation chamber internal metal surface when the TEPC is secured within the coupler annular section and the TEPC insulation layer is extending through the internal insulation chamber and out through the housing outlet.

2. The stress cone of claim 1 wherein the insulation chamber internal metal surface is oriented symmetrically about the axis and defines a desired symmetrical shape about the axis.

3. The stress cone of claim 2 wherein the desired shape is selected from the group consisting of conical-, frustoconical, trumpet-, and bell-like shapes.

4. The stress cone of claim 3, wherein each of the desired shapes has a first end and a second end, wherein the first end has a narrower diameter about the axis than the second end, and wherein the first end is coterminous with the coupler second opening.

5. The stress cone of claim 1 wherein the shoulder mating surface and the sheath termination end face are oriented at 90° relative to the axis.

6. The stress cone of claim 1 wherein the TEPC sheath ID$_1$ and the insulation chamber internal metal surface form a continuous ground plane transition surface.

7. The stress cone of claim 1 wherein the insulation material is selected from the group consisting of engineered polymers, perfluoroalkoxy (PFA), polyethylenes (PE), cross-linked polyethylenes (XLPE), ethylene propylene diene M-class (EPDM), ethylene propylene rubber (EPR), expanded polytetrafluoroethylene (ePTFE), corona-resistant PTFE, plastics, dielectric materials, dielectric fluids, grease, epoxy, urethane, polyetherimide, acrylic, PVC, polycarbonate, silicone rubber, polyester, polyamide, polyimide, polyamine, polypropylene laminated paper (PPLP), PTFE, oil, gas, perfluorinated liquids, composites, ceramics, brazed ceramics, glass and porcelain, and combinations thereof.

8. The stress cone of claim 1 wherein the outlet end of the housing further comprises an end cap which when removed, permits placement of the insulation material within the insulation chamber, and when attached, retains the insulation material within the insulation chamber, the end cap further comprising an apertured opening capable of permitting the TEPC insulation layer termination end to extend therethrough and out of the housing.

9. The stress cone of claim 8 wherein the insulation material is a solid material insertable into, and occupying, the internal insulation chamber, the solid material further comprising an outer surface corresponding to the insulation chamber internal metal surface, and an insulation material annulus oriented therethrough about the axis and capable of receiving the TEPC insulation layer therethrough, the insulation annulus having a first end coterminous with the coupler second end opening, a second end coterminous with the housing outlet, and an inner annular surface therebetween.

10. The stress cone of claim 9 wherein the dielectric adhesive is selected from the group consisting of epoxy-, silicone- and rubber-based adhesives.

11. The stress cone of claim 8 wherein the end cap further comprises a seal and where the apertured opening further comprises a seal for sealing around the TEPC insulation layer.

12. The stress cone of claim 1 wherein the insulation material is a solid.

13. The stress cone of claim 1 wherein the insulation material is a liquid.

14. The stress cone of claim 1 wherein the insulation material is a gas.

15. The stress cone of claim 1 wherein the insulation chamber is devoid of air when the TEPC insulation layer extends therethrough.

16. The stress cone of claim 1 wherein the TEPC insulation layer extends through the insulation layer centered about the axis.

17. The stress cone of claim 16 wherein the insulation material is mounted within the insulation chamber using a dielectric-based adhesive.

18. The stress cone of claim 16 wherein the insulation material is mounted within the insulation chamber with a dielectric fluid present between the insulation chamber internal metal surface and the insertable insulation material outer surface, and between the insertable insulation material inner annular surface and the TEPC insulation layer.

19. A stress cone for attachment over a terminated end of a tubing encapsulated power cable (TEPC) used in surface applications of a subsurface well power system employing electric submersible pumps comprising:

a. a tubing coupler capable of receiving the terminated end of the TEPC, the TEPC comprising a central conductor wire, a TEPC insulation layer of a desired outer diameter coaxially surrounding the conductor wire, and a metal tubing sheath having a desired wall thickness and diameter coaxially surrounding the TEPC insulation layer, the TEPC termination end comprising an end portion of the TEPC wherein a portion of the sheath has been cut off leaving a sheath termination end face and leaving a section of the TEPC insulation layer extending beyond the sheath termination face, and wherein a portion of the TEPC insulation layer has been removed from the extended section of the TEPC insulation layer to expose a section of the conductor wire, the tubing coupler comprising a coupler annular section comprising a coupler inlet end and a coupler outlet end oriented about a longitudinal axis, the coupler inlet end having an inner diameter capable of receiving the sheath terminated end face, the coupler outlet end capable of permitting the TEPC insulation layer termination end to extend therethrough, the coupler outlet end comprising a reduced inside diameter shoulder stop of inside diameter equal to the insulation layer outer diameter, the shoulder stop further comprising a shoulder mating surface facing toward the coupler inlet, the shoulder mating surface having a depth equal to the sheath wall thickness and capable of mating with the sheath termination end face when the terminated TEPC sheath is inserted into and secured to the coupler inlet end; and b. an enclosed insulation chamber capable of receiving an insulation material comprising
  i. an insulation chamber inlet end coterminous with the coupler outlet end,
  ii. an insulation chamber internal metal surface oriented symmetrically about the axis, the internal metal surface defining a desired symmetrical shape about the axis, the TEPC insulation layer capable of extending therethrough along the axis and being surrounded by the insulation material received within the insulation chamber, and
  iii. an insulation chamber outlet end comprising an apertured opening capable of receiving the extended section of the TEPC insulation layer therethrough.

20. The stress cone of claim 19 wherein the desired shape is selected from the group consisting of conical-, frustoconical, trumpet-, and bell-like shapes.

21. The stress cone of claim 20, wherein each of the desired shapes has a first end and a second end, wherein the first end has a narrower diameter about the axis than the second end, and wherein the first end is coterminous with the coupler second opening.

22. The stress cone of claim 19 wherein the shoulder mating surface and the sheath termination end face are oriented at 90° relative to the axis.

23. The stress cone of claim 19 wherein the shoulder mating surface and the sheath termination end face are in respective reverse bevels relative to the axis to permit the surfaces to mate together.

24. The stress cone of claim 19 wherein the TEPC sheath internal diameter and the insulation chamber internal metal surface form a continuous ground plane transition surface.

25. The stress cone of claim 19 wherein the insulation material is selected from the group consisting of engineered polymers, perfluoroalkoxy (PFA), polyethylenes (PE), cross-linked polyethylenes (XLPE), ethylene propylene diene M-class (EPDM), ethylene propylene rubber (EPR), expanded polytetrafluoroethylene (ePTFE), corona-resistant PTFE, plastics, dielectric materials, dielectric fluids, grease, epoxy, urethane, polyetherimide, acrylic, PVC, polycarbonate, silicone rubber, polyester, polyamide, polyimide, polyamine, polypropylene laminated paper (PPLP), PTFE, oil, gas, perfluorinated liquids, composites, ceramics, brazed ceramics, glass and porcelain, and combinations thereof.

26. The stress cone of claim 19 wherein the insulation chamber outlet end further comprises an end cap which when removed, permits placement of the insulation material within the insulation chamber, and when attached, retains the insulation material within the insulation chamber, the end cap further comprising an apertured opening capable of receiving and permitting the extended section of the TEPC insulation layer to extend therethrough and out of the insulation chamber.

27. The stress cone of claim 26 wherein the end cap further comprises a seal and where the apertured opening further comprises a seal for sealing around the TEPC insulation layer.

28. The stress cone of claim 26 wherein the insulation material is a solid material insertable into, and occupying, the internal insulation chamber, the solid material further comprising an outer surface corresponding to the insulation chamber internal metal surface, and an insulation material annulus oriented therethrough about the axis and capable of receiving the TEPC insulation layer therethrough, the insulation annulus having a first end coterminous with the coupler outlet end, a second end coterminous with the insulation chamber outlet, and an inner annular surface between the first and second annulus ends.

29. The stress cone of claim 28 wherein the insulation material is mounted within the insulation chamber using a dielectric-based adhesive.

30. The stress cone of claim 29 wherein the dielectric adhesive is selected from the group consisting of epoxy-, silicone- and rubber-based adhesives.

31. The stress cone of claim 28 wherein the insulation material is mounted within the insulation chamber with a dielectric fluid present between the insulation chamber internal metal surface and the insertable insulation material outer surface, and between the insertable insulation material inner annular surface and the TEPC insulation layer.

32. The stress cone of claim 19 wherein the insulation material is a solid.

33. The stress cone of claim 19 wherein the insulation material is a liquid.

34. The stress cone of claim 19 wherein the insulation material is a gas.

35. The stress cone of claim 19 wherein the insulation chamber is devoid of air when the TEPC insulation layer extends therethrough.

36. A high-pressure connector assembly for use on a terminated end of a tubing encapsulated power cable (TEPC) used in applications of a subsurface well power system employing electric submersible pumps, the TEPC comprising a central conductor section of a first outer diameter $OD_1$, a TEPC insulation layer coaxially surrounding the conductor and having a second outer diameter $OD_2$, and a metal tubing sheath coaxially surrounding the TEPC insulation layer, and having an internal diameter $ID_1$ equal to the second outer diameter $OD_2$, a third outer diameter $OD_3$, and a sheath width defined as the difference between the $ID_1$ and the $OD_3$, the terminated end of the TEPC creating a sheath termination end face, the TEPC insulation layer and conductor section extending for a desired length beyond the sheath termination end face, the conductor section extending for a desired length beyond a termination end of the TEPC insulation layer and terminating at central conductor termination end, the high pressure connector assembly comprising:

a. a metal housing comprising an inlet end and an outlet end oriented about a longitudinal axis;
b. an annular space located about the axis within the housing between the inlet end and the outlet end defined by inner housing metal surfaces,
c. a first high-pressure metal pressure fitting capable of receiving the sheath terminated end face and securing the TEPC cable into the housing inlet end in a pressure-tight seal;
  the first high-pressure metal pressure fitting further comprising a fitting annular section comprising a fitting inlet end and a fitting outlet end oriented about the longitudinal axis,
  the first fitting inlet end having an inner diameter capable of receiving the sheath terminated end face,
  the first fitting outlet end capable of permitting the TEPC insulation layer termination end to extend therethrough, the first fitting outlet end comprising a reduced inside diameter shoulder stop of inside diameter equal to the insulation layer outer diameter, the shoulder stop further comprising a shoulder mating surface facing toward the fitting inlet, the shoulder mating surface having a depth equal to the sheath wall thickness and capable of mating with the sheath termination end face when the terminated TEPC sheath is inserted into and secured to the first fitting inlet end;

d. a second high-pressure pressure fitting located at the outlet end;

e. a conductor pin mounted along the axis within the annular space and having a first end capable of being mounted in electrical conductive contact with the conductor section terminal end, and a second conductor pin end extending into the second high-pressure pressure fitting;

f. a socket to socket type connector located about the axis within the annular space comprising a first socket connector end for receiving the desired length of the conductor section extending beyond the termination end of the TEPC insulation layer, and a second end for receiving the first end of the conductor pin in abutted engagement with the conductor section terminal end;

g. an enclosed insulation chamber formed within the annular space capable of receiving an insulation material comprising
  i. an insulation chamber inlet end coterminous with the first fitting outlet end,
  ii. an insulation chamber internal metal surface oriented symmetrically about the axis, the internal metal surface comprising an electrical stress relief zone proximate the insulation chamber inlet end defining a desired symmetrical shape about the axis, the TEPC insulation layer capable of extending therethrough along the axis and being surrounded by the insulation material received within the insulation chamber, the socket to socket connection and conductor pin first end being surrounded by the insulation material,
  iii. an insulation chamber outlet end comprising an apertured opening capable of receiving the conductor pin second end therethrough and secured in sealed fashion; and h. an insulation material filling the annular space wherein the second high-pressure fitting located at the outlet end is capable of being secured, in pressure sealed fashion, to another TEPC cable.

37. The high-pressure connector assembly of claim 36 wherein the desired shape is selected from the group consisting of conical-, frustoconical, trumpet-, and bell-like shapes.

38. The high-pressure connector assembly of claim 36 wherein the insulation material is selected from the group consisting of brazed ceramics or glass, wherein the brazed ceramics and glass insulation materials are physically sealed to the inner housing metal surfaces, and wherein the insulation material is physically sealed about the conductor pin.

* * * * *